United States Patent
Nguyen et al.

(10) Patent No.: US 10,388,144 B2
(45) Date of Patent: Aug. 20, 2019

(54) FLUID LEAK DETECTOR ALARM MECHANISM

(71) Applicant: Ademco Inc., Golden Valley, MN (US)

(72) Inventors: Anh Nguyen, Bloomington, MN (US); Hyunki Kim, Rogers, MN (US)

(73) Assignee: Ademco Inc., Golden Valley, MN (US)

( * ) Notice: Subject to any disclaimer, the term of this patent is extended or adjusted under 35 U.S.C. 154(b) by 0 days.

(21) Appl. No.: 15/791,303

(22) Filed: Oct. 23, 2017

(65) Prior Publication Data

US 2018/0233022 A1 Aug. 16, 2018

Related U.S. Application Data

(63) Continuation-in-part of application No. 15/430,240, filed on Feb. 10, 2017.

(51) Int. Cl.
| | | |
|---|---|---|
| G08B 21/20 | (2006.01) | |
| G08B 25/10 | (2006.01) | |
| H04L 12/28 | (2006.01) | |
| G08B 25/00 | (2006.01) | |
| F24H 9/20 | (2006.01) | |
| G08B 1/08 | (2006.01) | |

(52) U.S. Cl.
CPC ........... *G08B 21/20* (2013.01); *F24H 9/2007* (2013.01); *G08B 1/08* (2013.01); *G08B 25/009* (2013.01); *G08B 25/10* (2013.01); *H04L 12/2816* (2013.01)

(58) Field of Classification Search
USPC ......................................................... 340/604
See application file for complete search history.

(56) References Cited

U.S. PATENT DOCUMENTS

| | | | |
|---|---|---|---|
| 3,289,936 A | 12/1966 | Coburn | |
| 3,523,175 A | 8/1970 | Gygax | |
| 4,211,735 A | 7/1980 | Berlin | |
| 4,257,389 A | 3/1981 | Texidor et al. | |
| 4,705,936 A | 11/1987 | Fowler | |
| 5,546,009 A * | 8/1996 | Raphael | G01F 23/242 324/556 |
| 6,389,881 B1 * | 5/2002 | Yang | G01M 3/243 73/40.5 A |
| 6,489,895 B1 * | 12/2002 | Apelman | G01M 3/18 137/312 |

(Continued)

FOREIGN PATENT DOCUMENTS

| | | |
|---|---|---|
| JP | 2012052168 A | 3/2012 |
| JP | 2012052700 A | 3/2012 |

OTHER PUBLICATIONS

George Risk Industries, "WS-20 Home Water Leak Alarm System," 3 pages, Jun. 20, 2008.

(Continued)

*Primary Examiner* — Omar Casillashernandez
(74) *Attorney, Agent, or Firm* — Shumaker & Sieffert, P.A.

(57) ABSTRACT

A system having a fluid leak detector, an audio detection circuit, and a processor. The fluid leak detector may have an audio alarm. The audio detection circuit may have a sound sensor and an audio-to-electrical signal converter. The processor may have an electrical signal-to-status of fluid presence. The fluid leak detector, the audio detection circuit and the processor may use very little power when in a standby detection mode.

20 Claims, 22 Drawing Sheets

(56) References Cited

U.S. PATENT DOCUMENTS

| | | | |
|---|---|---|---|
| 6,701,874 B1* | 3/2004 | Schultz | H01L 35/00 122/14.2 |
| 6,832,407 B2* | 12/2004 | Salem | A47L 7/0028 15/319 |
| 7,142,123 B1 | 11/2006 | Kates | |
| 7,973,667 B2 | 7/2011 | Crnkovich et al. | |
| 8,031,079 B2* | 10/2011 | Kates | G08B 19/00 340/539.1 |
| 9,262,909 B1* | 2/2016 | Grant | G08B 29/126 |
| 9,433,742 B2 | 9/2016 | Manzke et al. | |
| 2004/0060346 A1* | 4/2004 | Bonne | G01N 1/24 73/61.44 |
| 2005/0067049 A1* | 3/2005 | Fima | F24H 9/2007 141/192 |
| 2005/0275528 A1* | 12/2005 | Kates | G08B 1/08 340/539.22 |
| 2006/0044133 A1 | 3/2006 | Lou | |
| 2009/0224927 A1* | 9/2009 | Sudy | G01M 3/24 340/605 |
| 2011/0093220 A1* | 4/2011 | Yang | G01M 3/243 702/51 |
| 2013/0021159 A1* | 1/2013 | Timm | G01M 3/243 340/605 |
| 2013/0037129 A1* | 2/2013 | Murphy | F24H 9/165 137/393 |
| 2015/0000380 A1 | 1/2015 | Cho et al. | |
| 2016/0172570 A1* | 6/2016 | Wright | H01L 35/32 136/238 |

OTHER PUBLICATIONS

Light Engineered Displays, Inc., "Aqua Alert Advanced Leak Detection Systems," 2 pages, prior to Jul. 20, 2016.
Ellis, "Detecting Alarm Sounds," Department of Electrical Engineering, Columbia University, New York, NY, USA,www.ee.columbia.edu, 4 pages, prior to Sep. 27, 2016.
U.S. Appl. No. 15/430,240, filed Feb. 10, 2017.
Office Action from U.S. Patent Appl. No. 15/430,240, dated Feb. 28, 2019, 12 pp.

\* cited by examiner

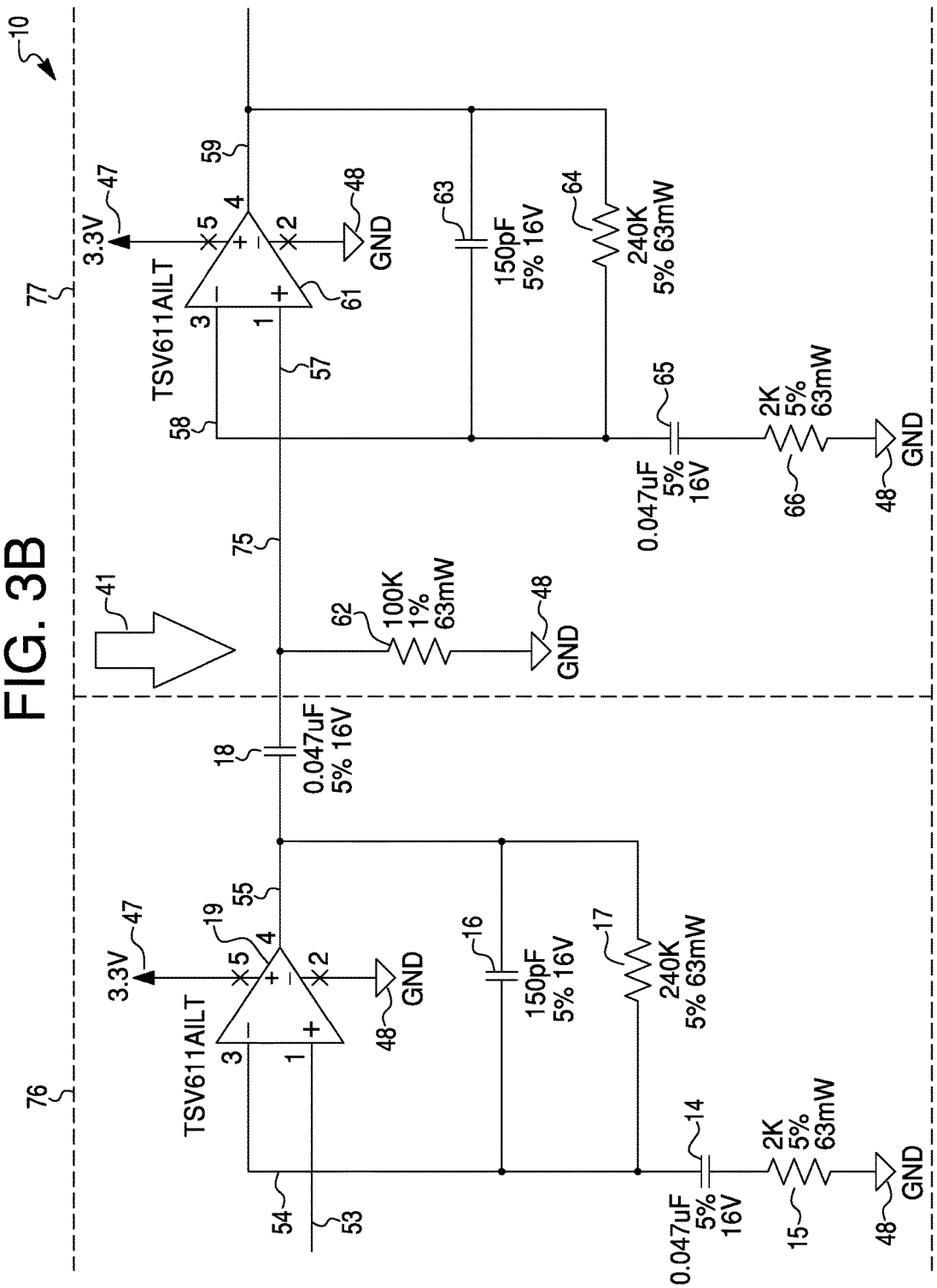

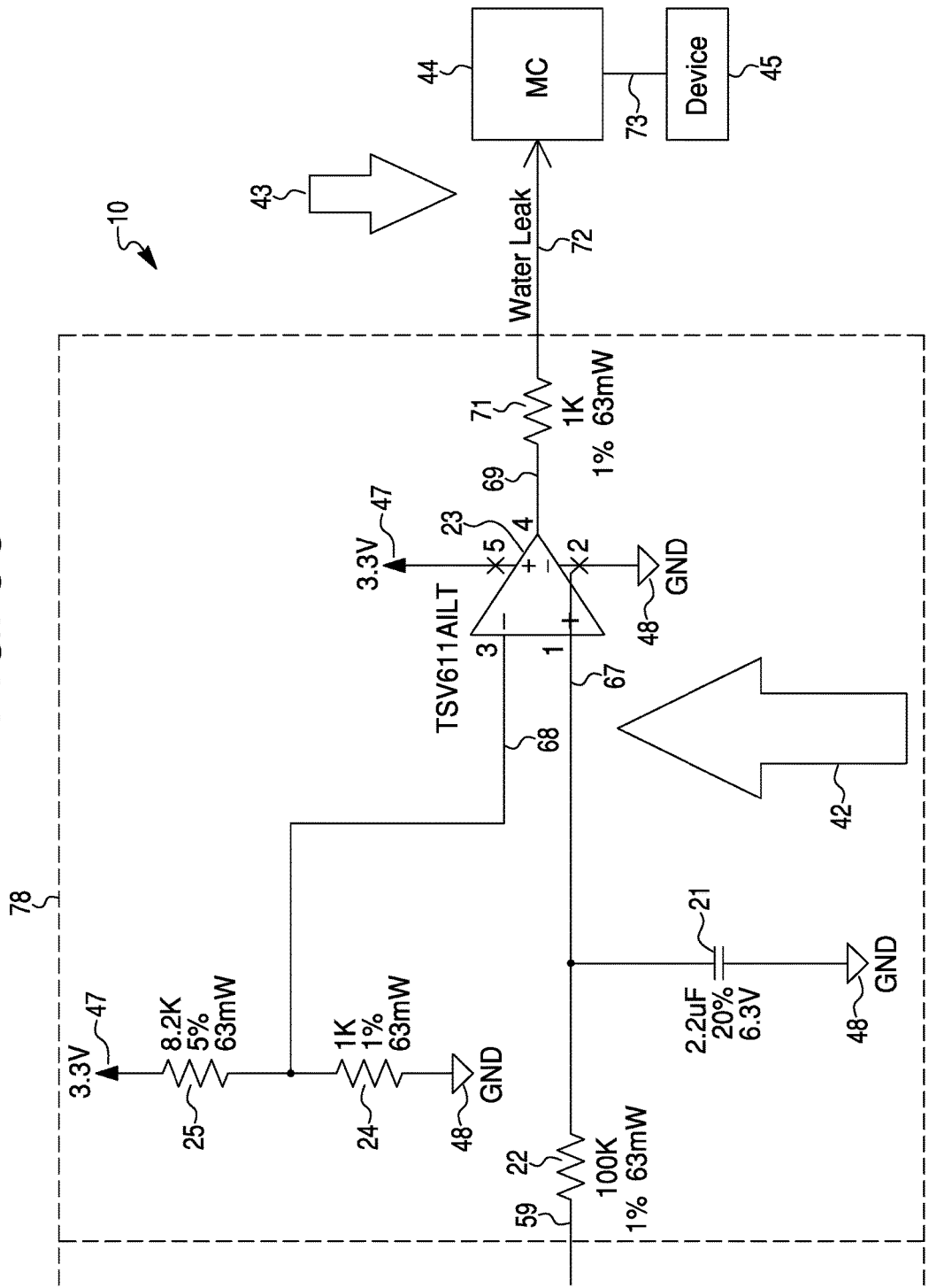

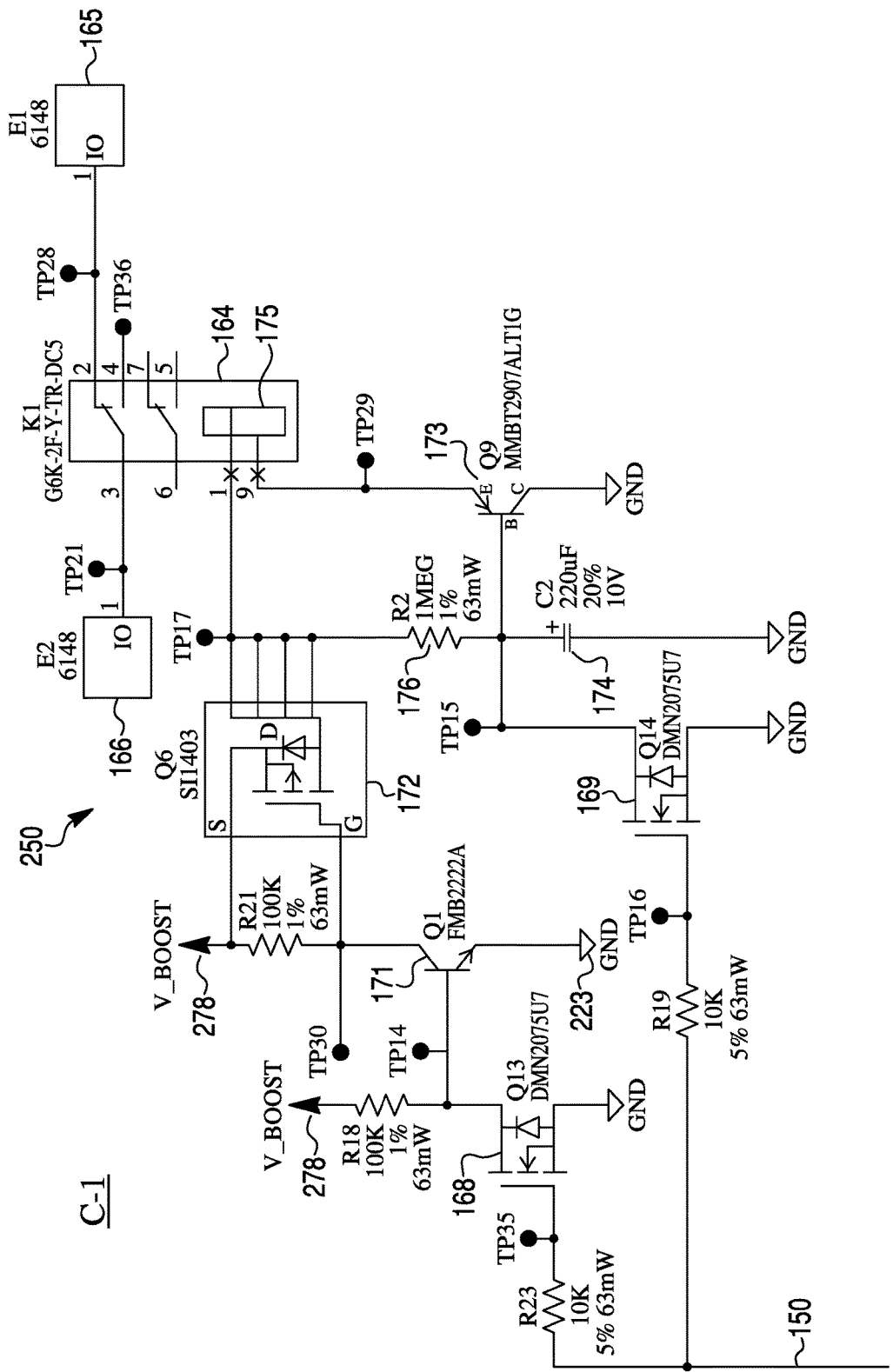

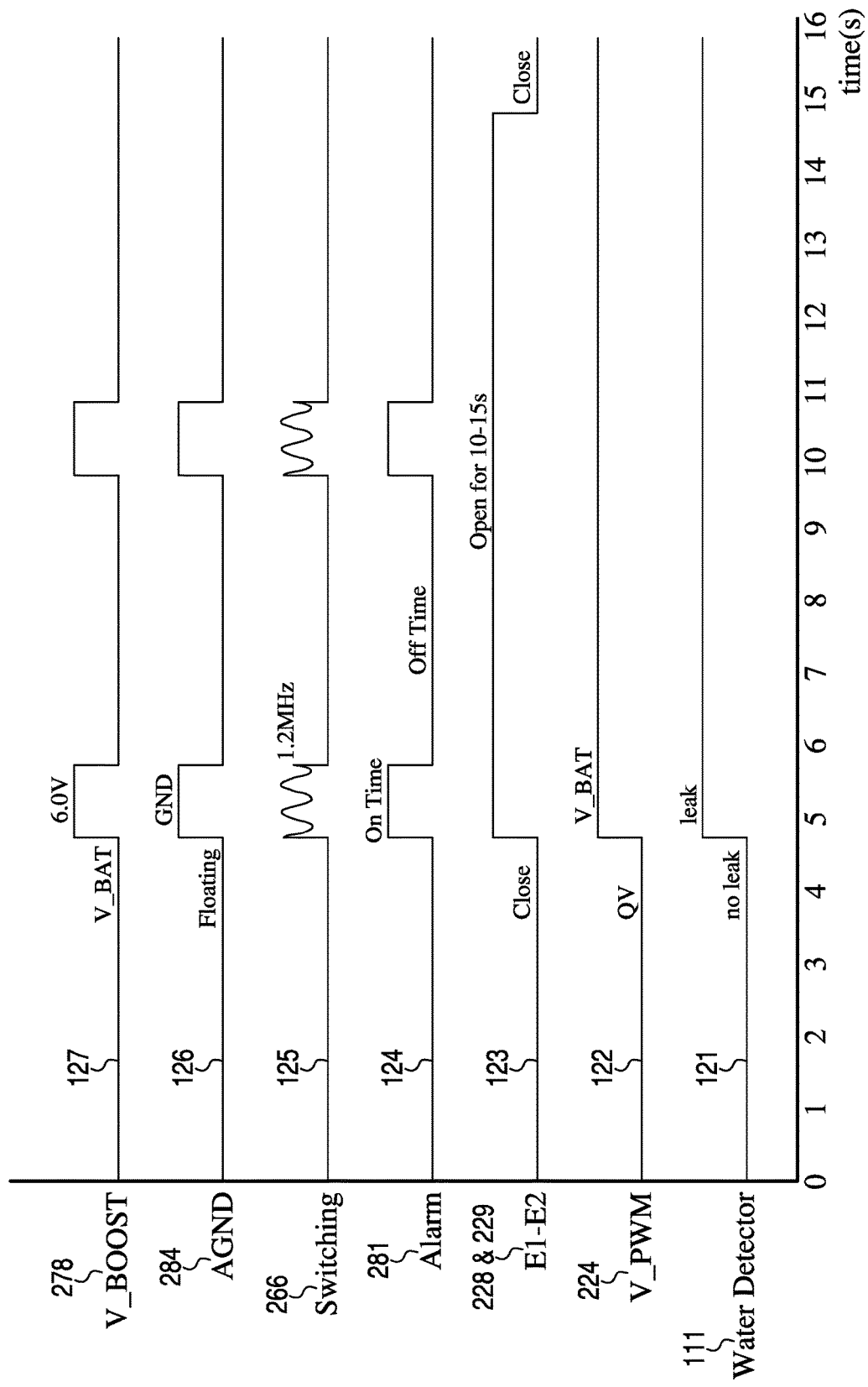

FLUID LEAK DETECTOR ALARM MECHANISM

The present application is a continuation-in-part of U.S. patent application Ser. No. 15/430,240, filed Feb. 10, 2017. U.S. patent application Ser. No. 15/430,240, filed Feb. 10, 2017, is hereby incorporated by reference.

BACKGROUND

The present disclosure pertains to alarm systems and systems for detecting abnormal environmental situations around equipment.

SUMMARY

The disclosure reveals a system having a fluid leak detector, an audio detection circuit, and a processor. The fluid leak detector may have an audio alarm. The audio detection circuit may have a sound sensor and an audio-to-electrical signal converter. The processor may have an electrical signal-to-status of fluid presence. The fluid leak detector, the audio detection circuit and the processor may use very little power when in a standby detection mode.

BRIEF DESCRIPTION OF THE DRAWING

FIGS. 3a-3c constitute a schematic of the conversion circuit;

FIG. 9a is a diagram of an alternative safety feature;

FIG. 15 is a timing diagram of a detection portion of the system.

DESCRIPTION

Figure 1:
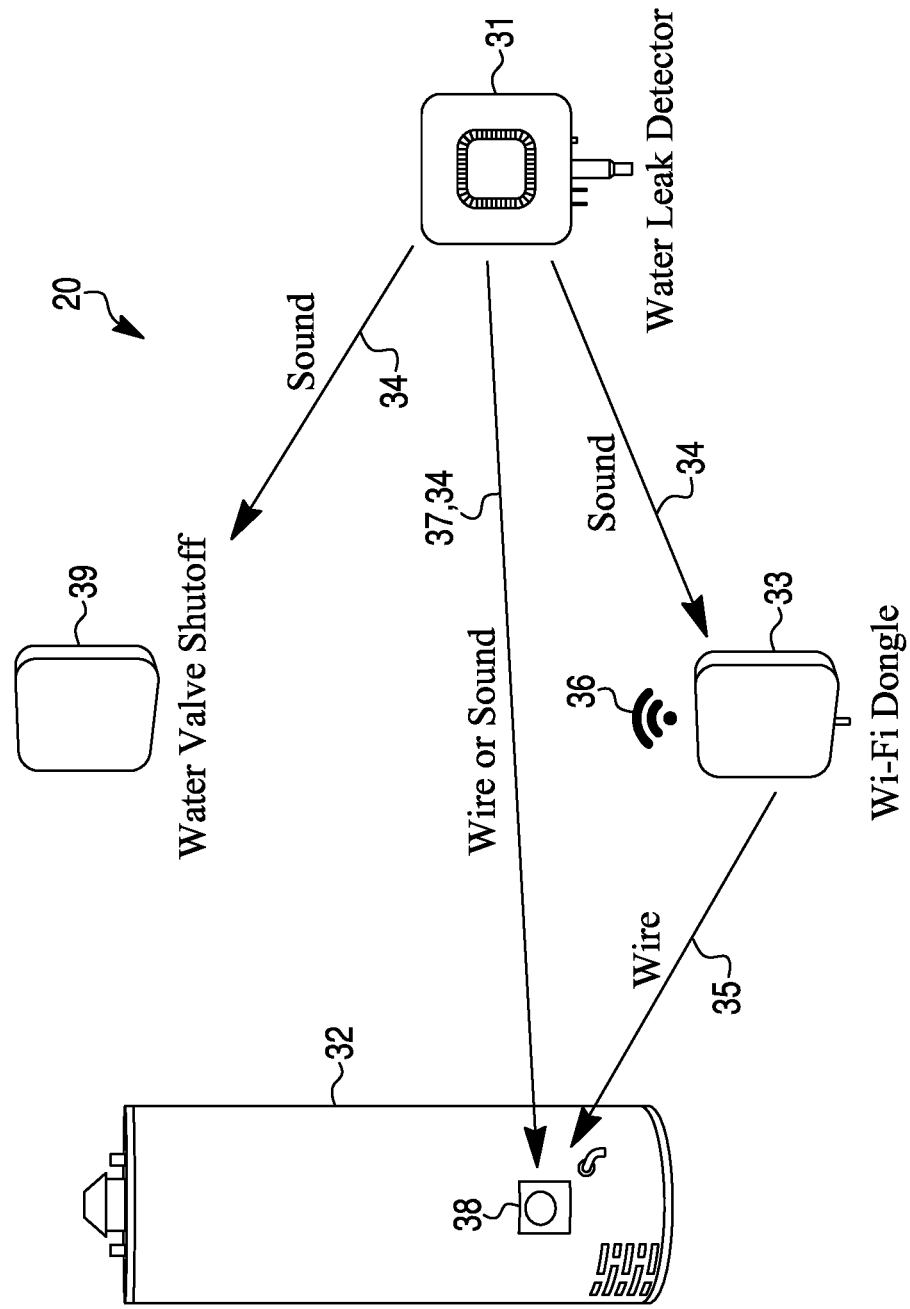
FIG. 1 is a diagram of layout of the alarm sound detection system integrated with a water heater.

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

Aspects of the system or approach may be described in terms of symbols in the drawing. Symbols may have virtually any shape (e.g., a block) and may designate hardware, objects, components, activities, states, steps, procedures, and other items.

There appear to be many alarm devices in the market today. Their primary application appears to detect and warn people when there is a presence of smoke, fire, water leak, and so on. Many of these devices may be battery powered, so one of motivation in this area would tend to design a system that would last for a long time at a low cost. The present device may be used for a water leak alarm system but the device may be also used for any other kind of alarm system. A water leak detector may be designed to detect a water leak from a water heater, alert the customer about the detected leak with sound, and shut off the water heater's gas valve to prevent or minimize property damage caused by a water leak. The water leak detector may detect water with a metal probe. In addition, the customer may use a water sensing cable to extend the sensing area. The device may be battery powered which can work up to ten years without incident in a standby mode. A lower power design may allow the alarm to stay on for a long time when there is a water leak present in case the customer is not at home.

A circuit may be for a leak detector and its sound generating portion. The detector may detect a water leak and generate a 100 DB sound tone that beeps for one second in every five seconds. Another kind of detection, such as that of smoke, may be indicated by another sound pattern.

There may be a variety of sounds that are generated for the sound detection circuit to pick up. The detection circuit may pick up all kinds of sound within a certain area; however, a microcontroller on the listening device will only accept a sound that has a special on and off pattern and duration for a particular kind of detection. For example, when there is a leak detected, the leak detector may produce an alarm sound that beeps for one second every five seconds. This alarm sound may last for two to three days, depending on how much power is in the batteries at that moment. If power consumption is a concern, the listening device such as a Wi-Fi dongle will only need to check for this alarming sound every two to five minutes. When, this sound pattern is detected, the listening device may verify that the alarm stays on for at least one to five minutes to avoid being a false alarm. This recognition may be done with software. This approach may work for other applications as well. One may have a smoke detector that beeps for one second in every two seconds, a gas detector that beeps for two seconds every four seconds, and so on. These patterns may be updated in the listening device either manually or remotely. The listening device may detect and identify sounds from different sources and be able to determine whether the detected sound is relevant or not.

The sound detection circuit and controller may translate the variety of sounds into numerous kinds of information and messages. Unlike voice processing and detecting, the outcome of the sound is just a modulated pulse width modulated (PWM) signal. From the PWM signal, the microcontroller may extract the frequency and duty cycle data and determine whether the data is coming from the water leak detector or some other sensor detector. The detector may translate the sound into a message that a leak that has been detected.

If the sound detection circuit is situated in the Wi-Fi dongle, and the dongle is an option that is not necessarily selected or purchased by the customer, then the sound detection circuit may be included in a future water heater controller so that one does not have to use a cable harness. The sound detection circuit may also be included in a water valve shutoff device so that one can shut off the main water valve when there is a leak detected.

A purpose for Wi-Fi may be to link and relay information/status to other connected devices in a house such as a Wi-Fi thermostat, phone, tablet, computer, and so forth. Wi-Fi may also allow a customer to turn on or off the water heater and change a temperature set point from anywhere having a connected device. A feature of the present system is a low power, low cost way compared to, for example, Wi-Fi, Redlink™, or Bluetooth™, to pass simple information from sensor to a main controller.

For example, a Wi-Fi dongle may be a way to add Wi-Fi to an existing/new non-connected water heater control module. The wireless Dongle may communicate to the water heater control module via wire/cable.

A water leak detector 31 powered by one or more small batteries may detect water leak anywhere in a building, such as under a residential water heater 32 shown in a diagram of FIG. 1. When there is a leak present, leak detector 31 may turn off water heater 32 via a wire 37 or alarm sound 34 and water heater control 38. Alarm sound 34, for example, may have a pattern or configuration with beeps for about one second long at every five or so seconds for moisture or water detection. Alarm sound 34 may have other patterns or configurations. Alarm sound 34 may turn off or on a water supply via a water valve shut-off mechanism 39. An optional Wi-Fi dongle 33 may be obtained to let a customer interact with water heater 32 through Wi-Fi 36. A connection from the Wi-Fi dongle 33 to water heater 32 may be lost and the customer will be left wondering what happened, unless there is a way for leak detector 31 to tell Wi-Fi dongle 33 that it turned off water heater 32 because of a water leak. One may implement this feature by providing wire signals from leak detector 31 to Wi-Fi dongle 33 but this way would increase the overall dimension of leak detector 31. The extra circuitry may decrease the battery lifetime and make leak detector 31 more expensive for the customer who does not want to obtain or purchase the Wi-Fi dongle 33 option.

However, if a customer wanted a Wi-Fi dongle 33, a wire connection 35 may be made between Wi-Fi dongle 33 and heater 32 which would avoid a problem of a connection from the Wi-Fi dongle 33 to water heater 32 that may be lost.

Figure 2:
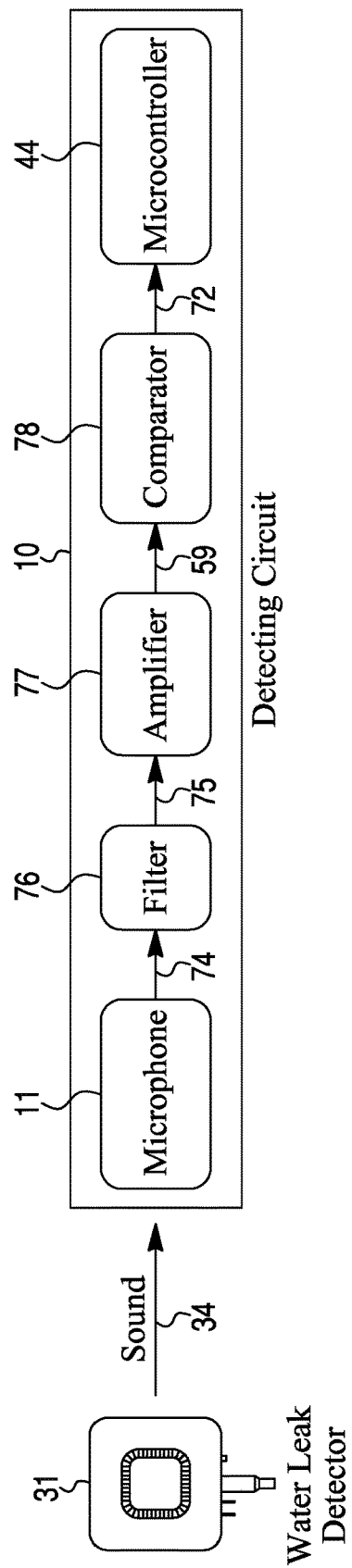
FIG. 2 is a diagram of a conversion circuit.

FIG. 2 is a diagram of water leak detector 31 and alarm sound detection circuit 10. Sound 34 may go from water leak detector 31 to a microphone 11. An output from a microphone 11 may be connected to an input of a filter 76 by a line 74. An output from filter 76 may be connected to an input of an amplifier 77 by a line 75. An output of amplifier 77 may be connected to an input of a comparator 78 by a line 59. An output of comparator 78 may be connected to a microcontroller 44 by a line 72.

Figure 3A:
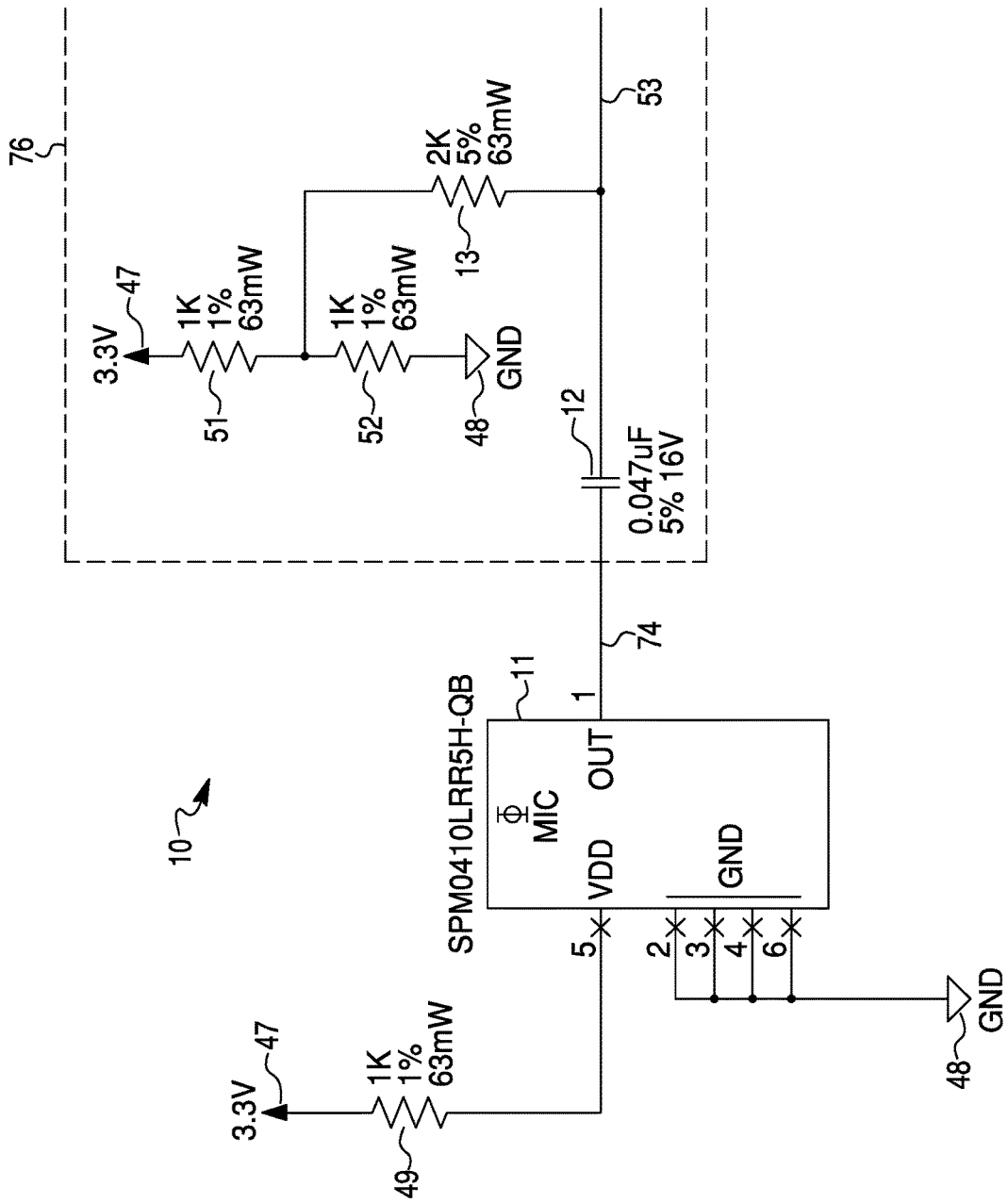

FIGS. 3a, 3b and 3c show a schematic of water leak detector alarm sound detection circuit 10. Circuit 10 may detect sound 34 from water leak detector 31 while ignoring all of the ambient noise and sounds that are not coming from the water leak detector 31. Circuit 10 may convert the alarm sound 34 to a modulated square waveform 43 which can be recognized by a microcontroller 44 inside Wi-Fi dongle 33. An arrangement 20 of FIG. 1 may solve virtually all the issues indicated above and avoid the cumbersomeness of having wires running between the leak detector 31 and Wi-Fi dongle 33. Arrangement 20 may be more customer friendly since the installer does not necessarily have to worry about wiring and the cost of the circuit may be cheaper than the cost of the wire version.

Figure 4A:
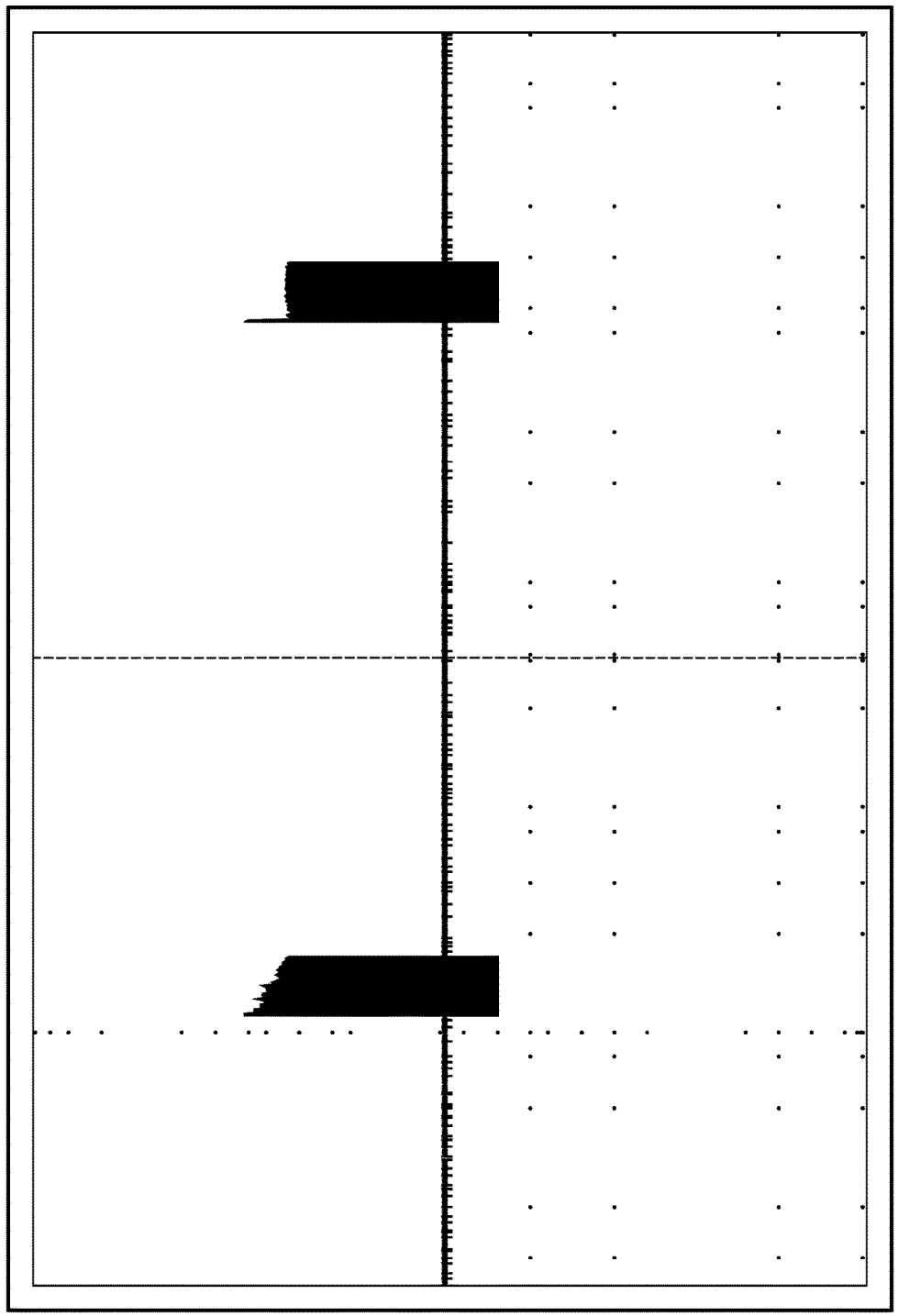
FIGS. 4a-4c are diagrams of waveforms at designated points of the conversion circuit.

In circuit 10, a microphone 11 may pick up all of the sound signals around a designated area. An output 74 representing sound signals may pass from microphone 11 through a filter arrangement 76 having a high pass filter at 1.7 KHz with capacitor 12, resistor 13, capacitor 14, and resistor 15. A low pass filter may cut off all of the high frequency signals above 4.4 KHz with capacitor 16 and resistor 17. A gain may be set to a maximum gain of an operational amplifier 19 with resistor 17 and resistor 15. Capacitor 18 may filter out a signal DC offset that is amplified by operational amplifier 19. Signal 41 on line 75 may then be amplified by amplifier arrangement 77 in order to increase the operating range and to get enough power at an output 59 as an input for post processing. FIG. 4a reveals a diagram of signal 41.

Figure 4B:
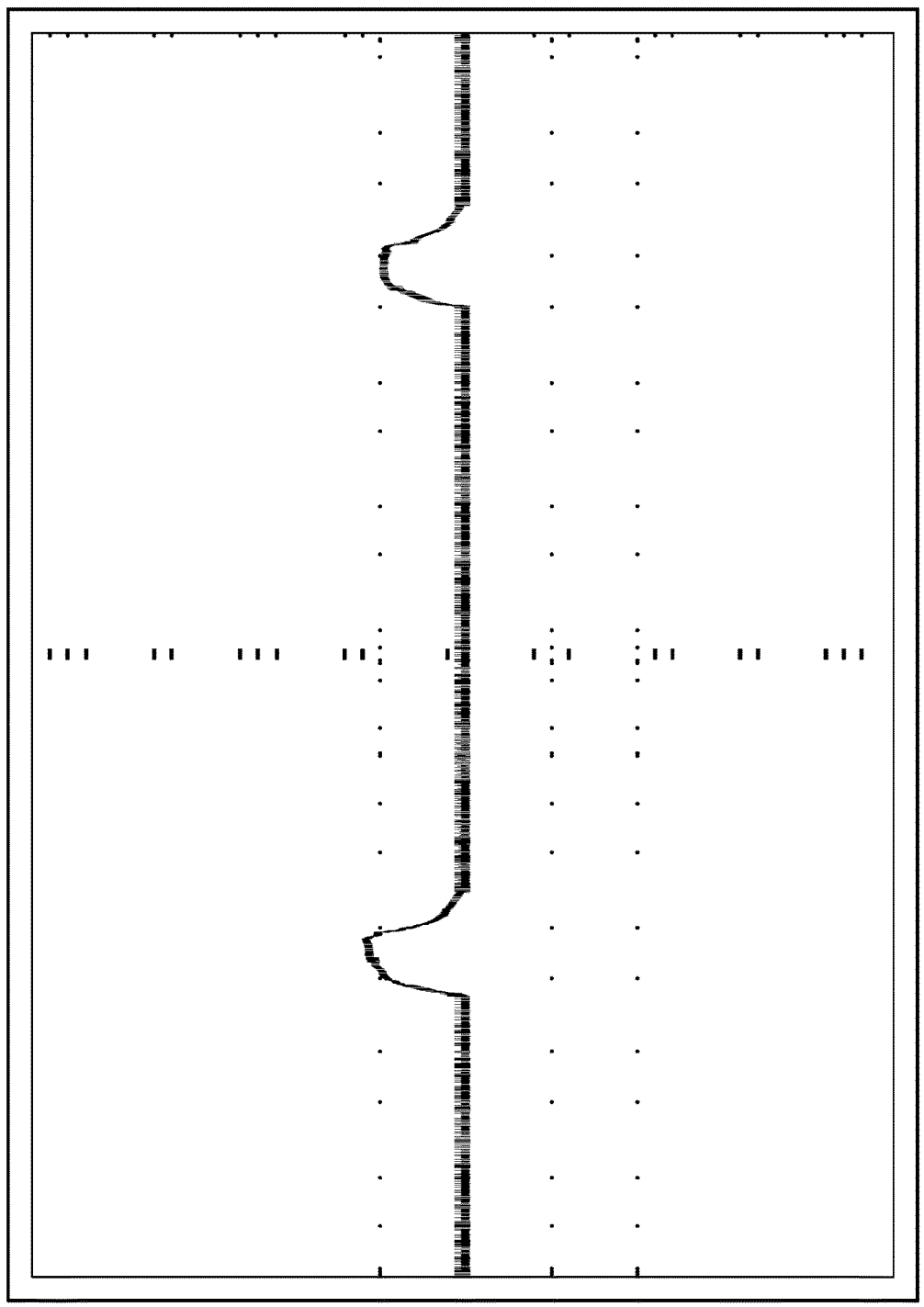

Capacitor 21 may convert a continuous high frequency signal originally from leak detector 31 to a DC level. Capacitor 21 and resistor 22 may also filter out virtually all of the noise from other sounds. Operational amplifier 23 may have input 67 to boost the signals to 3.3V and do a final cleaning of the signal as a comparator 78. FIG. 4b is a diagram of a signal 42 that may be on input 67.

Figure 4C:
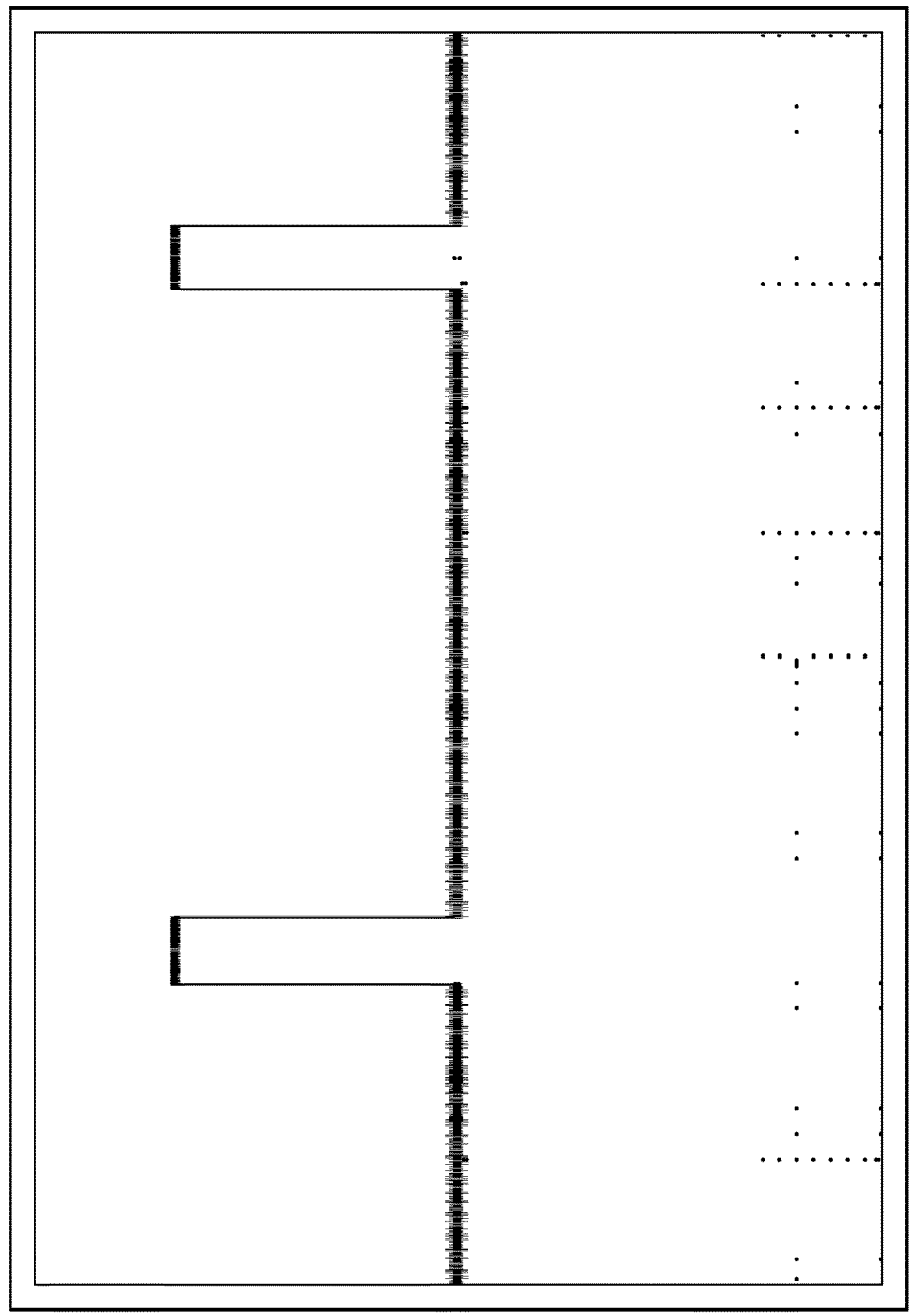

Resistor 24 and resistor 25 may set the threshold that prevents all of the unwanted sound from going to the final signal. A final signal on a line 72 may be modulated square waveform 43 that can be decoded with a controller or microcontroller 44, or other device or mechanism, having an output 73 to a device 45 with a wire or wireless connection. FIG. 4c is a diagram of waveform 43. Device 45 may provide information of output 73 to various recipients.

Other components and connections of the various components of circuit 10 may be noted. Microphone 11 may be connected to a 3.3V source 47 via a 1K resistor 49, and to a ground or reference 48. An output of microphone 11 may go through a 0.047 microfarad capacitor 12 to a non-inverting input 53 of operational amplifier 19. A 2K resistor 13 may have one end connected to non-inverting input 53 of operational amplifier 19. The other end of resistor 13 may be connected to one end of a 1K resistor 51 and one end of a 1K resistor 52. The other end of resistor 51 may be connected to source 47. The other end of resistor 52 may be connected to ground 48. Amplifier 19 may have connections to source 47 and ground 48.

A 150 pico farad capacitor 16 may have one end connected to input 54 and the other end connected to an output 55 of amplifier 19. A 240K resistor 17 may have one end connected to input 54 and the other end connected to output 55. A 0.047 micro farad resistor 14 may have one end connected to input 54 and the other end connected to one end of 2K resistor 15. The other end of resistor 15 may be connected to ground 48.

A 0.047 micro farad capacitor 18 may have one end connected to output 55 and the other end connected to a non-inverting input 57 of an operational amplifier 61. One end of a 100K resistor 62 may be connected to input 57 and the other end of resistor 62 may connected to ground 48. A 150 pico farad capacitor 63 may have one end connected to an inverting input 58 of operational amplifier 61 and have the other end connected to an output 59 of amplifier 61. A 240 K resistor 64 may have one end connected to input 58 and the other end connected to output 59. A 0.047 micro farad capacitor 65 may have one end connected to input 58 and the other end connected to one end of a 2K resistor 66. The other end of the 2K resistor may be connected o round 48.

A 100K resistor 22 may have one end connected to output 59 of amplifier 61. The other end of resistor 22 may be connected to a non-inverting input 67 of amplifier 23, and to one end of a 2.2 micro farad capacitor 21. The other end of capacitor 21 may be connected to ground 48. One end of a 1K resistor 24 and one end of an 8.2K resistor may be connected to an inverting input 68 of amplifier 23. The other end of resistor 24 may be connected to ground 48. The other end of resistor 25 may be connected to source 47.

A 1K resistor 71 may have one end connected to an output 69 of amplifier 23. The other end of resistor 71 may be a water leak output 72. Amplifier 23 may have connections to source 47 and ground 48.

The components and connection configuration are one example of the circuits and arrangement of the present system and approach. Other components and configurations may represent an arrangement of the present system and approach. The present system and approach may be utilized for other fluids.

Figure 5:
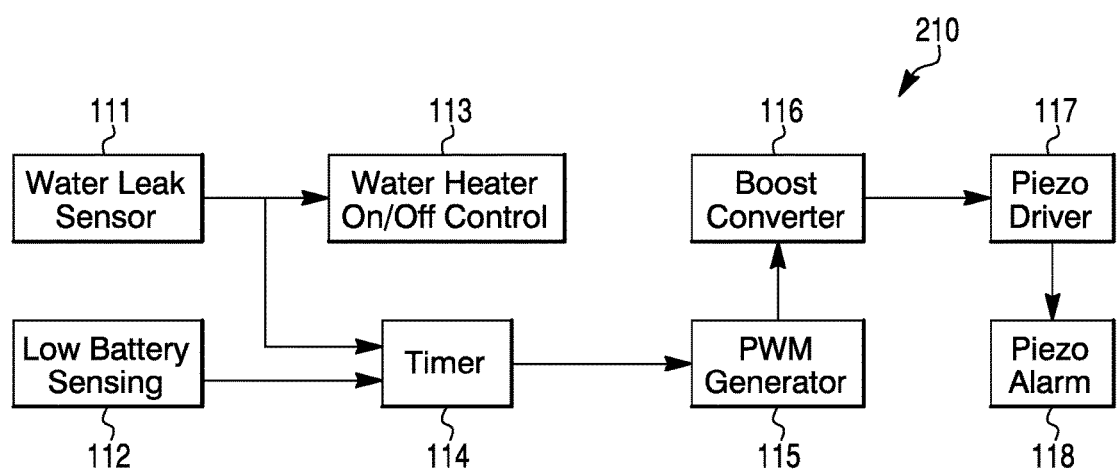
FIG. 5 is a diagram of an example of a water leak detector system.

FIG. 5 is a block diagram of an example of a present water leak detector system 210. A water leak sensor 111 and the low battery sensing circuit 112 may be on a standby mode. System 10 may monitor water leaks and battery voltage all the time. Very low current, such as less than one milliamp, may be consumed until the water leak sensor 111 or low battery sensing block 112 is activated. A water heater on/off control 113 may be used to turn on a relay or enable another safety feature. A boost converter 116 may provide a power boost to drive a piezo driver circuit 117. Piezo driver circuit 117 may drive a piezo 118 to create a loud sound. A timer 114 and a PWM generator 115 may cycle turn on and off boost converter 116 and piezo driver circuit 117.

Figure 6:
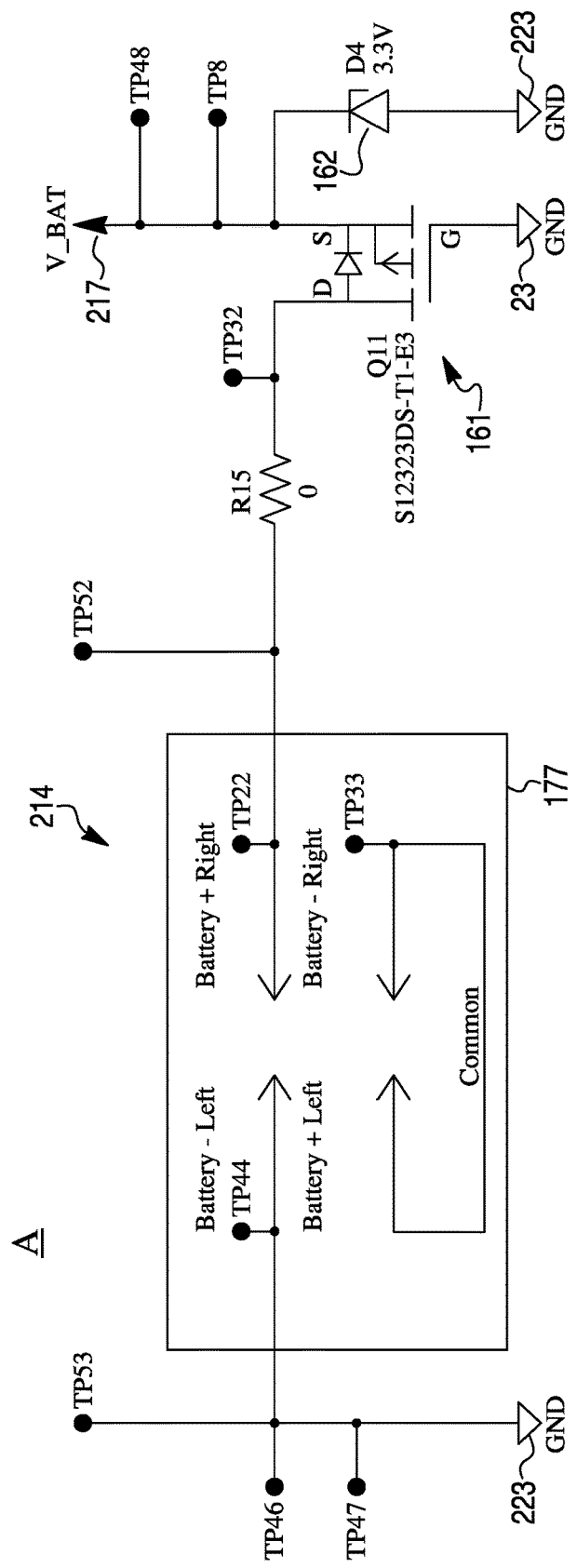
FIG. 6 is a diagram that shows a battery pack.
Figure 7:
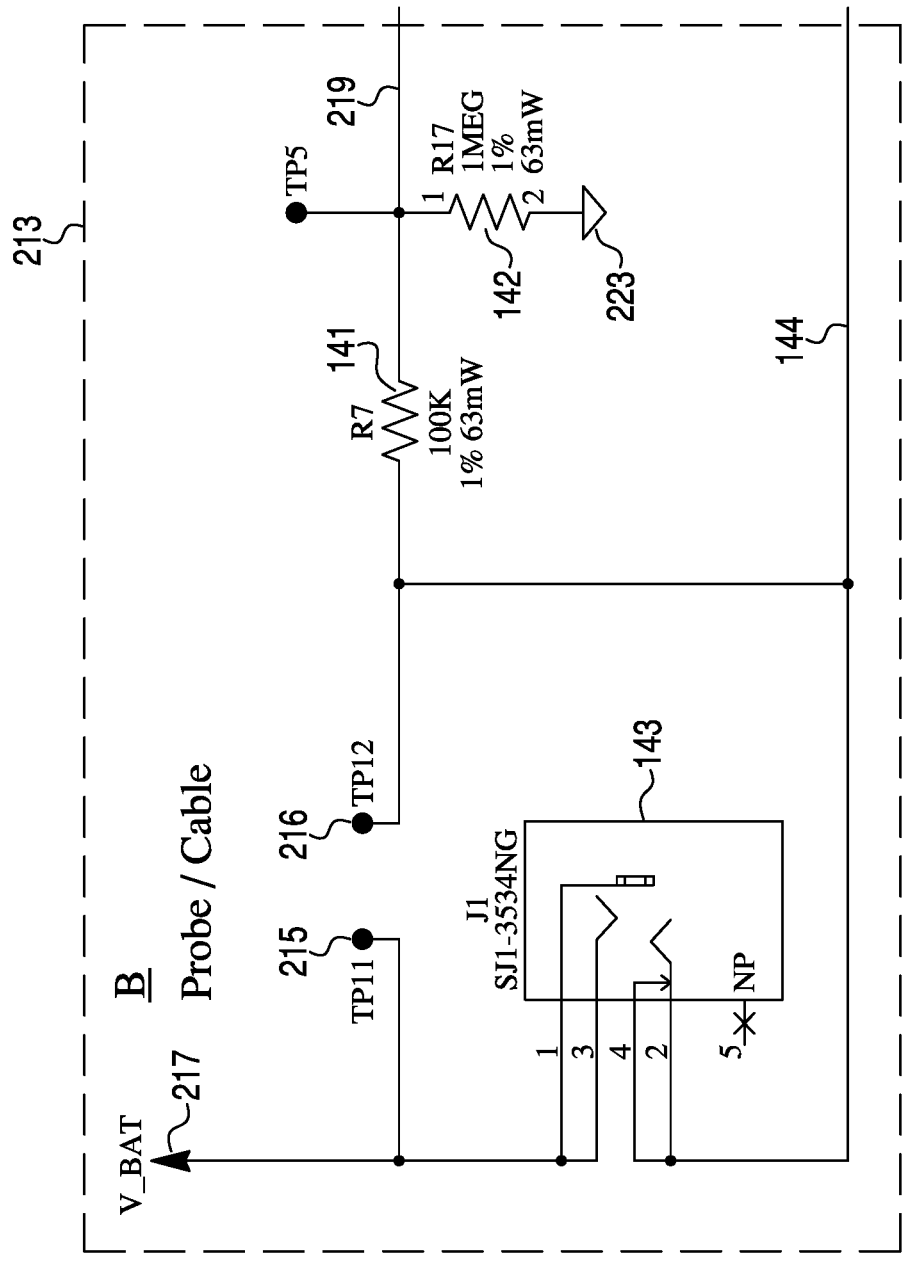
FIG. 7 and FIG. 8 are diagrams that reveal a water sensing circuit.
Figure 8:
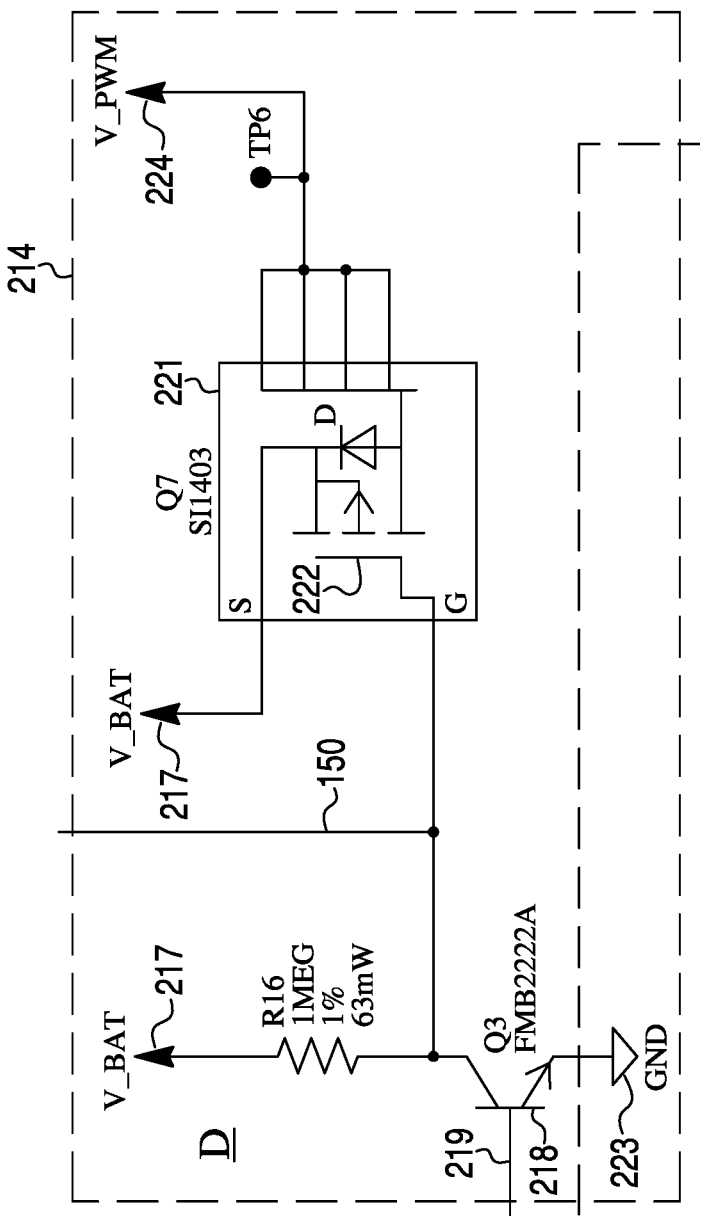

Components of water leak sensor 111 may be noted. Block 214 (A) in the FIG. 6 schematic shows two double-A batteries in series, and may provide V_BAT 217 from 2V-3.3V to drive system 10 through a P channel MOSFET 161 (Q11), which will protect a battery 177 from drain when battery 177 is installed in reverse direction. Diode 162 (D4) may be a 3.3V TVS and can be used to protect circuits from electrostatic discharge (ESD). Block 213 (B) of FIG. 7 and block 214 (D) of FIG. 8 may be the water sensing circuit. When water is present, an impedance may appear between point 215 (TP11) and point 216 (TP12), and may allow V_BAT 217 from block 213 (B) to turn on transistor 218 (Q3) in block 214 (D). Transistor 218 (Q3) may be an NPN transistor that may turn on when there is 0.6 V applied to its base via line 219. A one micro-fared capacitor and a 3.3V TVS diode (not shown) may be connected between line 219 and ground 223. When there is no water, transistor 218 (Q3) may be in the off state and the voltage applied to a gate 222 of a transistor 221 (Q7) may be equal to V_BAT 217. When there is water present, transistor 218 (Q3) may turn on and pull gate 222 of transistor 221 (Q7) towards a ground 223 and turn it on. When transistor 221 (Q7) turns on, V_PWM 224 may connect to V_BAT 217 and provide power to a timer and a pulse width modulation (PWM) generator.

Figure 9:
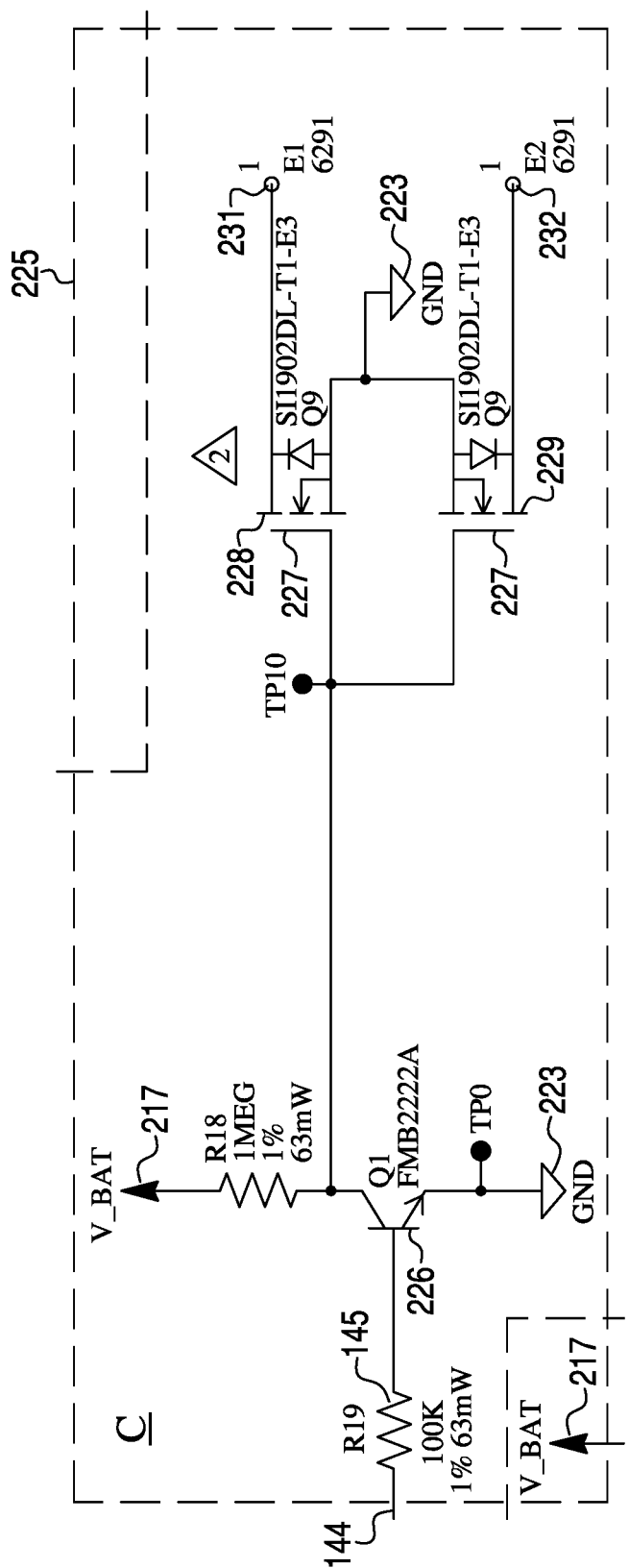
FIG. 9 is a diagram of a safety feature that may be used in the water leak detector.

Water heater on/off control 113 may be noted. A block 225 of FIG. 9 (C) shows a safety feature that may be used in the water leak detector. When there is no water present, a transistor 226 (Q1) may be in the off state and a voltage may appear at gates 227 of transistors 228 and 229 (Q9) that is equal to V_BAT 217. When there is water present, transistor 226 (Q1) may be on and pull gates 227 of transistors 228 and 229 (Q9) to a ground level 223. Transistors 228 and 229 (Q9) may be of a bidirectional N-channel MOSFET chip such that it turns on when a voltage difference between a gate and source appears greater than its threshold voltage. The body diodes, within the MOSFET may prevent current flow from terminal 231 (E1) to terminal 232 (E2), and vice versa when transistors 228 and 229 (Q9) are in the off state. Terminal 231 (E1) and terminal 232 (E2) may be connected to a thermopile. When there is no water, the thermopile may provide power to the water heater control board and turn on a gas valve. When water is present, transistors 228 and 229 (Q9) may turn off, the gas valve may disconnect and the fire in the water heater may turn off.

In another approach circuit 250 (block C-1) of FIG. 9*a*, a 5V non-latched relay 164 could be used to control the switch between component 165 (E1) and component 166 (E2). In standby mode, component 165 (E1) and component 166 (E2) may be connected to each other, allowing power to flow between a thermopile and water heater through pin 2 and pin 3 of relay 164 (K1). When there is a water leak, transistor 168 (Q13) and transistor 169 (Q14) turn off and transistor 171 (Q1), 172 (Q6), and 173 (Q9) turn on. During the same time a capacitor 174 (C2) is being charged by V_BOOST 278 at 6V, a relay coil 175 is being energized through transistor 173 (Q9). Terminals 165 and 166 are disconnected during the energizing of relay coil 175 until capacitor 174 (C2) voltage reaches 6V. When capacitor 174 (C2) voltage reaches 6V, transistor 173 (Q9) turns off and no current flows to relay coil 175. Terminals 165 and 166 reverse back to a previous position, which is a normally closed contact. This process may take about 10 to 15 seconds. When there is no water, transistor 168 (Q13) and transistor 169 (Q14) turn on and V_BOOST 278 is blocked because transistor 172 (Q6) and transistor 171 (Q1) are off. Capacitor 174 (C2) may be fully discharged to GND 223 but relay 164 will remain in a normally closed contact. This design may also ensure that terminals 165 and 166 stay connected in order to keep the water heater in an operational mode even if battery 177 is dead. This feature is different from a previous MOSFET design. A line 150 in circuit 250 (block C-1) of FIG. 9*a* may be connected to a collector of NPN transistor 218 in FIG. 8.

Low battery sensor 112 may be designed to monitor a 3V battery voltage all of the time with a very low power (e.g., micro power) consumption. In block 233 (E) of FIG. 10, a PNP transistor 234 (Q5) may turn on and off by a voltage drop across a resistor 235 (R27), which may be determined by the amount of current flowing to a cathode of a shunt regulator 236 (U4). A low battery threshold voltage may be set to a different value with a change in resistance of resistor 235 (R27). When transistor 234 (Q5) turns on, the current flow in it may be a very small so it cannot control transistor 236 (Q4). With capacitor 237 (C11) on the transistor 234 (Q5) collector, more energy may be stored in capacitor 237 (C11) and it may control transistor 236 (Q4) without failure. When V_BAT 217 drops to the threshold voltage, which is set to be 2.2V in this case, transistor 234 (Q5) may turn off, transistor 238 (Q8) may turn on and connect V_BAT 17 to V_PWM 224. Transistor 234 (Q5) may be made independent from the cathode current of shunt regulator 236 (U4) by a diode 241 (D5) and a diode 242 (D6). Therefore, transistor 234 (Q5) may turn on/off only by an amount of voltage drop across resistor 235 (R27). A 35 uA cathode current of shunt regulator 236 (U4) may be selected to operate properly in this application. In another approach shown by a circuit 260 (block E-1) of FIG. 10*a*, the current sensor IC 179, such as TPS3710, may replace shunt regulator 236 (U4), diode 241 (D5), diode 242 (D6), transistor 230 (Q4), and transistor 234 (Q5) for cost savings.

Figure 11:
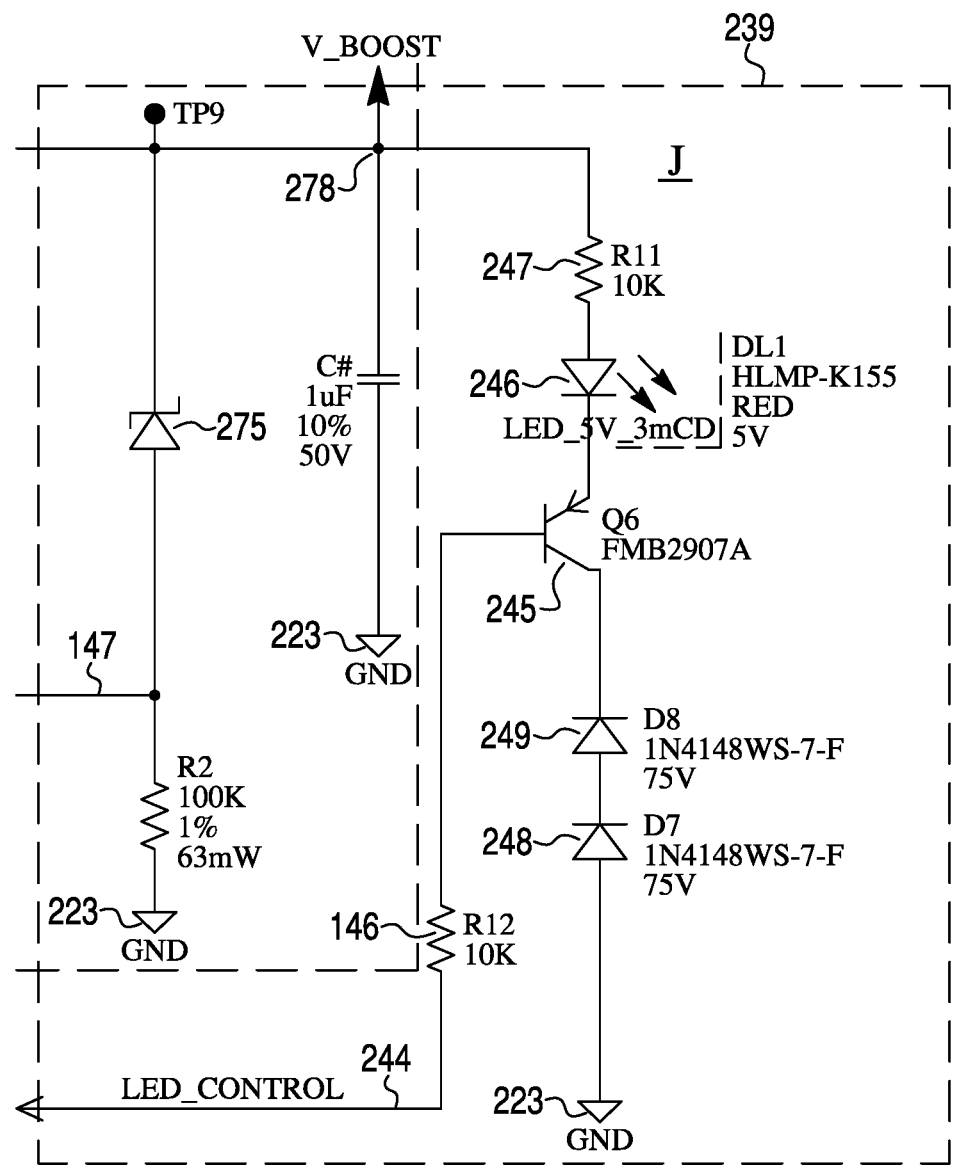
FIG. 11 is a diagram of a low battery warning indicator.

A low battery warning LED 246 may be included in block 239 (J) of FIG. 11. When a LED_CONTROL signal on line 244 changes to low by a low battery sensing circuit, transistor 245 (Q6) may turn on and LED 246 (DL1) may turn on. A resistor 247 (R11) may be used to limit the current going through LED 246 (DL1). In order to prevent transistor 245 (Q6) from turning on may result in LED 246 from going dim while the LED_CONTROL signal on line 244 stays low; a diode 248 (D7) and a diode 249 (D8) may be used to increase transistor 245 (Q6) base threshold voltage by its voltage drop and to float the LED voltage from ground 223.

Figure 11A:
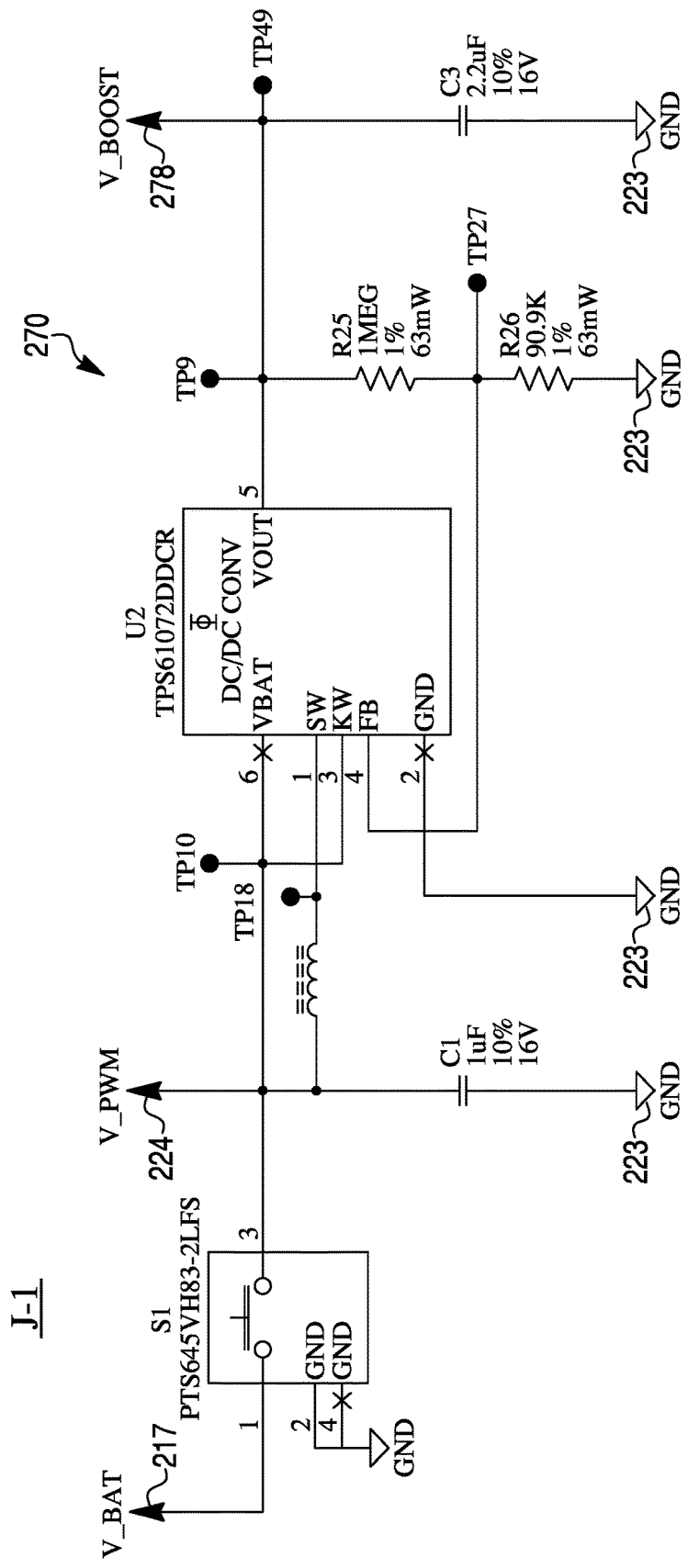
FIG. 11a is a diagram of a boost converter circuit.

FIG. 11a is a diagram of a circuit 270 (block J-1) that may be an example of boost converter 116.

A timer 114 may be noted. A block 251 (F) of FIG. 12 may be an inverting voltage level detector circuit with hysteresis. It may turn PWM and a buzzer on/off repeatedly in intervals determined by a 1.5V reference voltage, hysteresis resistors, and a charging circuit. The upper and lower threshold voltages may be selected to be 1.6V and 1.3V, respectively. Hysteresis voltage may be 0.3V and determined by a resistor 252 (R6) from 10K*(3/0.3). When 3V is applied to V_PWM 224, external timing capacitors, capacitor 253 (C4) and capacitor 254 (C10), may be charged up to ⅔*VCC through a resistor 255 (R13) and resistor 256 (R14), respectively. During charging, the output and charging voltage may be electrically isolated and independent by a diode 257 (D3). The output may stay high for 4 seconds during the time interval that capacitors 253 and 2254 (C4 and C10) charge from ⅓*VCC to ⅔*VCC and it may be low for 1 second during the time interval that capacitors 253 and 254 (C4 and C10) discharge from 1.6V to 1.3V through diode 257 (D3). Block 251 (F) may be powered by V_PWM 224 so it is in the off state when there is no water in order to save battery power. Resistor 181 (R11), resistor 182 (R12), transistor 183 (Q3), and transistor 184 (Q12) may be used to extend the alarm off time in order to save battery power when the device is working in low a battery mode. Transistor 185 (Q2), resistor 186 (R22), resistor 187 (R3) and transistor 188 may be used to operate piezo driver 117 with low power consumption. AGND 284 and GND 223 in piezo driver 117 may be connected together, and an alarm sound can occur whenever a low signal appears at an output 189 (pin 7) of amp 151 (U3).

Figure 13:
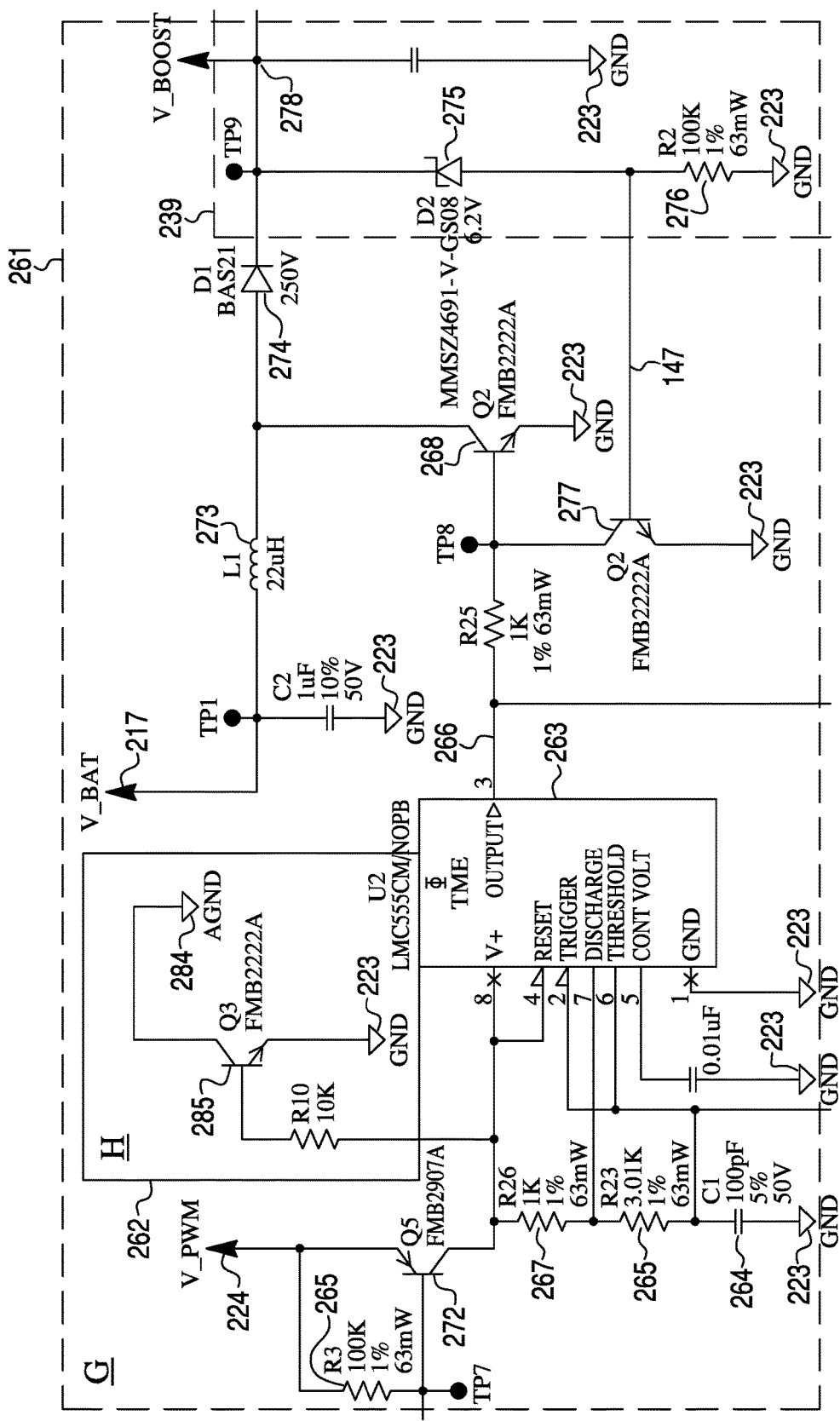
FIG. 13 is a diagram of a pulse width generation circuit that uses a timer.

FIG. 13 is a diagram of a block 261 (G) that incorporates a block 262 (H) that may have PWM generation circuit 115 that uses a timer 263 (IC 555). When a capacitor 264 (C1) discharges through a resistor 265 (R23), an output terminal 266 (pin 3) may go low, and when capacitor 264 (C1) charges through resistor 265 (R23) and a resistor 267 (R26), output terminal 266 (pin 3) may go high. The sequence may repeat and turn on/off a transistor 268 (Q2). A high interval time may be given by 0.695*(R23+R26)*C1 and a low interval time may be given by 0.695*R23*C1.

Figure 14:
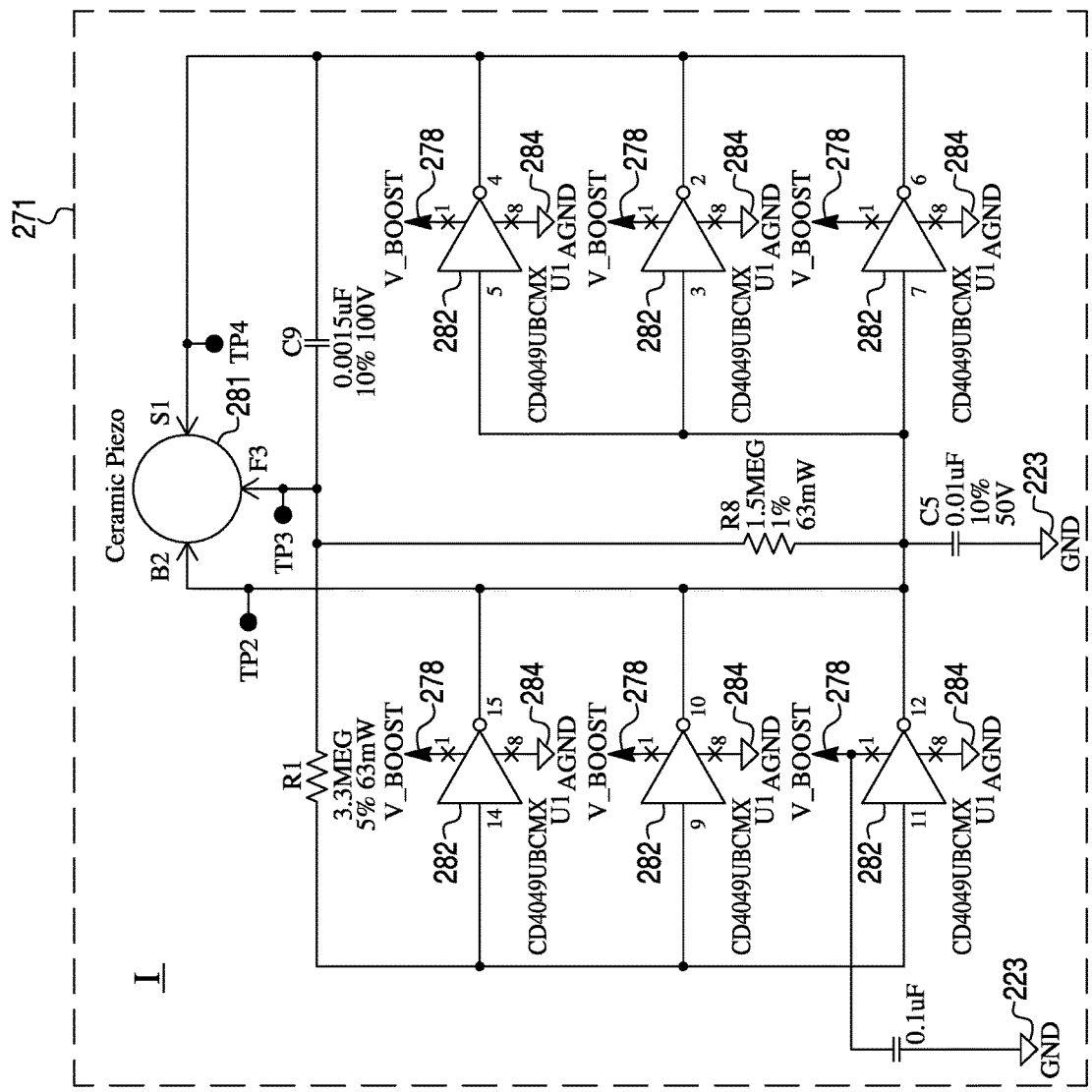
FIG. 14 is a diagram of an example piezo driver and alarm.

Boost converter 116 may convert V-BAT 217 up to 6.0V boost voltage 278. This voltage may be used to drive LED 246 and a piezo driver circuit in block 271 (I) of FIG. 14. NPN transistor 268 (Q2) may be used as a switch in the boost converter. A switching frequency of 1.2 MHz may be generated by the 555 timer IC 263 in block 261 (G). A transistor 272 (Q5) may be a switch that cuts the power from V_PWM 224 to timer IC 263 during a buzzer's off time. Timer IC 263 may be also in the off mode when there is no water present because V_PWM 224 would be zero. Energy may be stored in an inductor 273 (L1), when the switching transistor turns on, and discharged to an output 211 off. This process may be repeated to boost the battery voltage. A Zener diode 275 (D2) may be used as a 6.0 reference voltage and a resistor 276 (R2) may be used to limit the current going to diode 275 (D2). Whenever the output voltage is greater than 6.0V, another NPN transistor 277 (Q2) may turn on and control a duty cycle of main switching transistor 268 and it may maintain the output voltage below 6.0V under any load conditions.

Piezo driver circuit 117 may be used to drive an alarm 118 such as a piezo 281. Circuits 117 and 118 as one instance among others for a driver and alarm may be shown in block 271 of FIG. 14. A three-terminal type of piezo 281 may be used to generate sound. It may work at 6.0VDC and generate sound using CMOS inverters 282, such as CD4069 and CD4049. The oscillation frequency of about 3.2 KHz and 40 V peak to peak sine wave may be applied to the transducer. An alarm ground (AGND) 284 plane of this driver circuit may be isolated from the main ground (GND) 223 plane. An NPN transistor 285 (Q3) in block 262 (H) may turn on and connect two ground planes 223 and 284 when the sound is on and turn off when the sound is off. Transistor 285 (Q3) may ensure that there is no current flow from V_BAT 217 to the piezo driver circuit when the sound is off. Transistor 285 may perform the same function of transistor 188 in FIG. 12.

FIG. 15 is a timing diagram of items in terms of amplitude versus time for the water leak detector system. Trace 121 is an indication of a leak or no leak detected by water detector 111. Trace 122 shows V_PWM 224 at zero volts when there is no indication of a leak by water detector 111 and at V_BAT volts where there is an indication of a leak. Trace 123 notes terminals 165 and 166 (K1 in FIG. 9a) to be closed during a no leak indication and open, for about 10 to 15 seconds, during a leak indication of detector 111. Trace 124 shows when the alarm turns on at the beginning of the leak indication and alternates being on and off during the leak indication. Trace 125 reveals a switching on and off of a 1.2 MHz signal 266 from a timer chip 263 that follows a pattern of trace 124. Trace 126 is of a potential of an alarm ground 284 which floats during a no leak indication and then is connected to main ground 223 by transistor 285 (Q3) upon the indication of a leak by detector 111. However, alarm ground 284 may be disconnected and connected during the leak indication in synch with trace 125. Trace 127 notes voltage of V_BOOST 278 to be at the V_BAT 217 potential until a leak indication when it goes to about 6.0 volts for a duration that alarm ground 284 is connected to main ground 223 as indication by trace 126. Then trace 127 may show V_BOOST 278 to return to V_BAT 217 when trace 126 shows alarm ground 284 to be floating again in a synchronous fashion alternatively and so on during the leak indication. The order of traces 121 through 127 does not necessarily mean that a causal relationship exists in that order.

FIGS. 6-14 reveal portions of a schematic of the present system 210. These drawings represent one illustrative example of system 210. There may be other drawings that represent system 210. The following information may indicate common conductive connections and lines among the portions. Base 219 of transistor 218 of FIG. 8 may be connected to one end of resistors 141 (R7) and 142 (R17) of FIG. 7. The other end of resistor 141 may be connected to point 216, jack 143 and line 144. The other end of resistor 142 may be connected to ground 223. Line 144 may be connected to one end of resistor 145 (R19) in FIG. 9. The other end of resistor 145 may be connected to a base of transistor 226.

Figure 10:
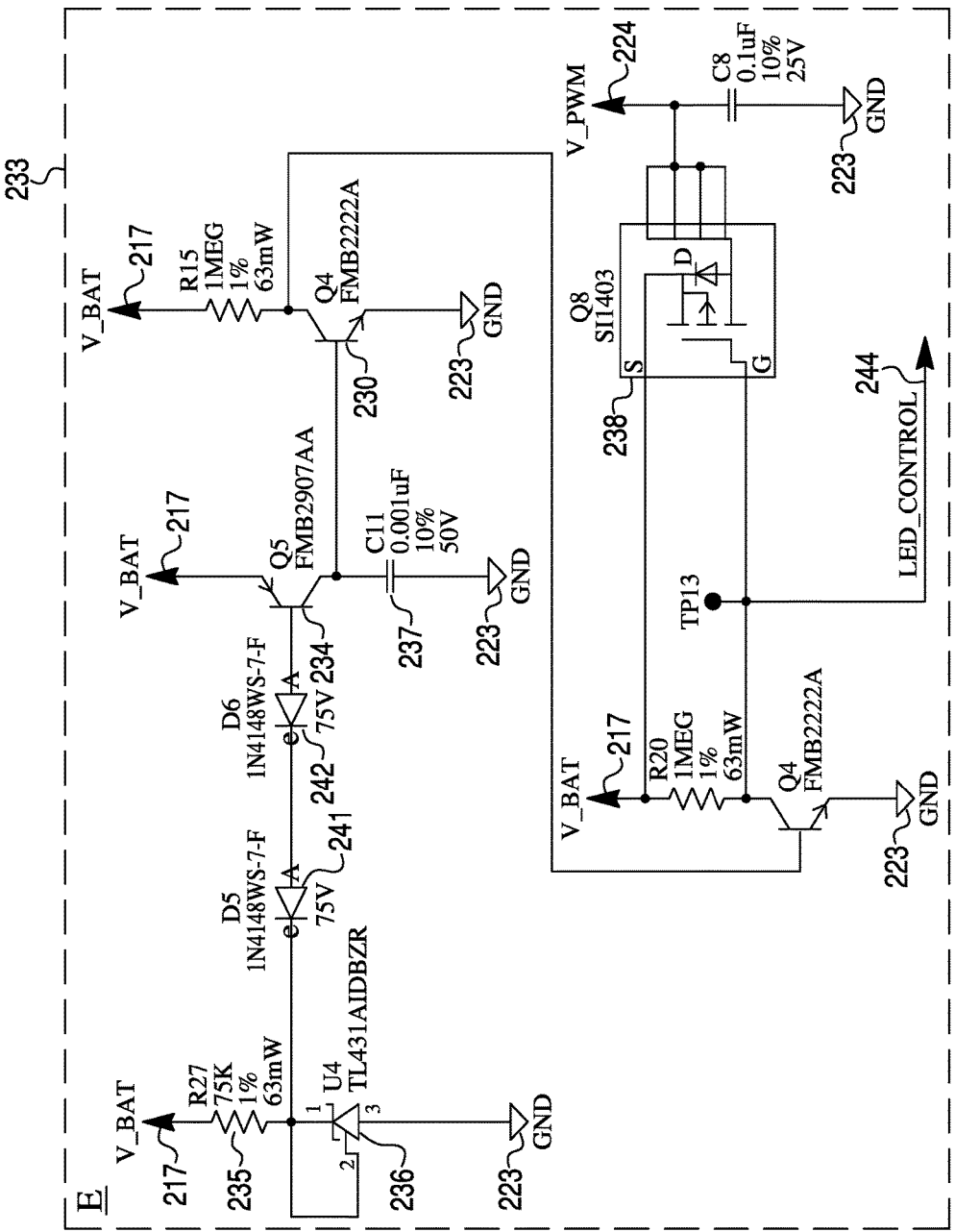
FIG. 10 is a diagram of a low battery sensor.
Figure 10A:
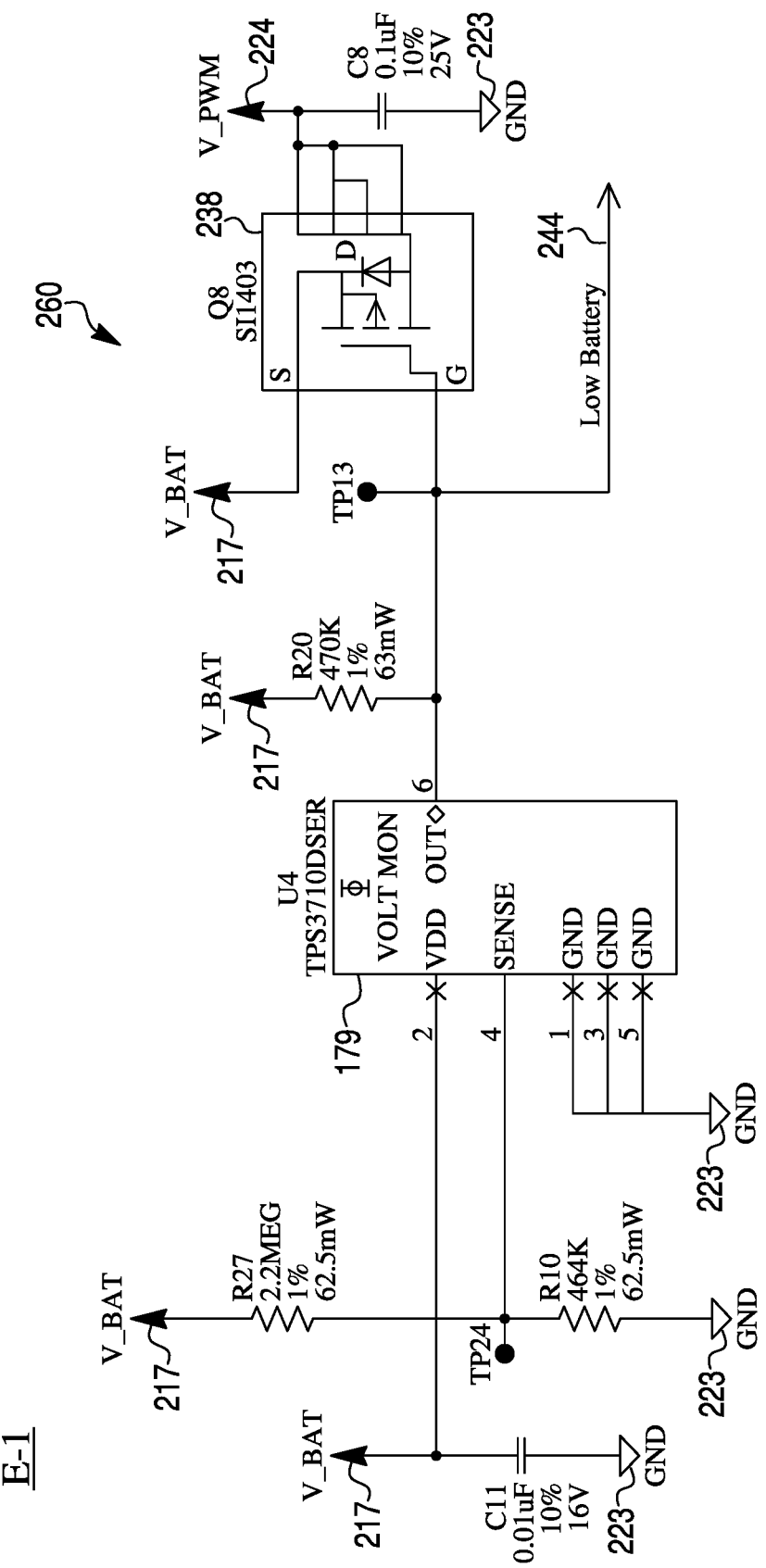
FIG. 10a is a diagram of another low battery sensor.

Line 244 of FIG. 10 may go to one end of a resistor 146 (R12) of FIG. 11. The other end of resistor 146 may go to a base of transistor 245. A line 147 may go from an anode of Zener diode 275 (block 239) in FIG. 11 to a base of transistor 277 (block 261) of FIG. 13.

Figure 12:
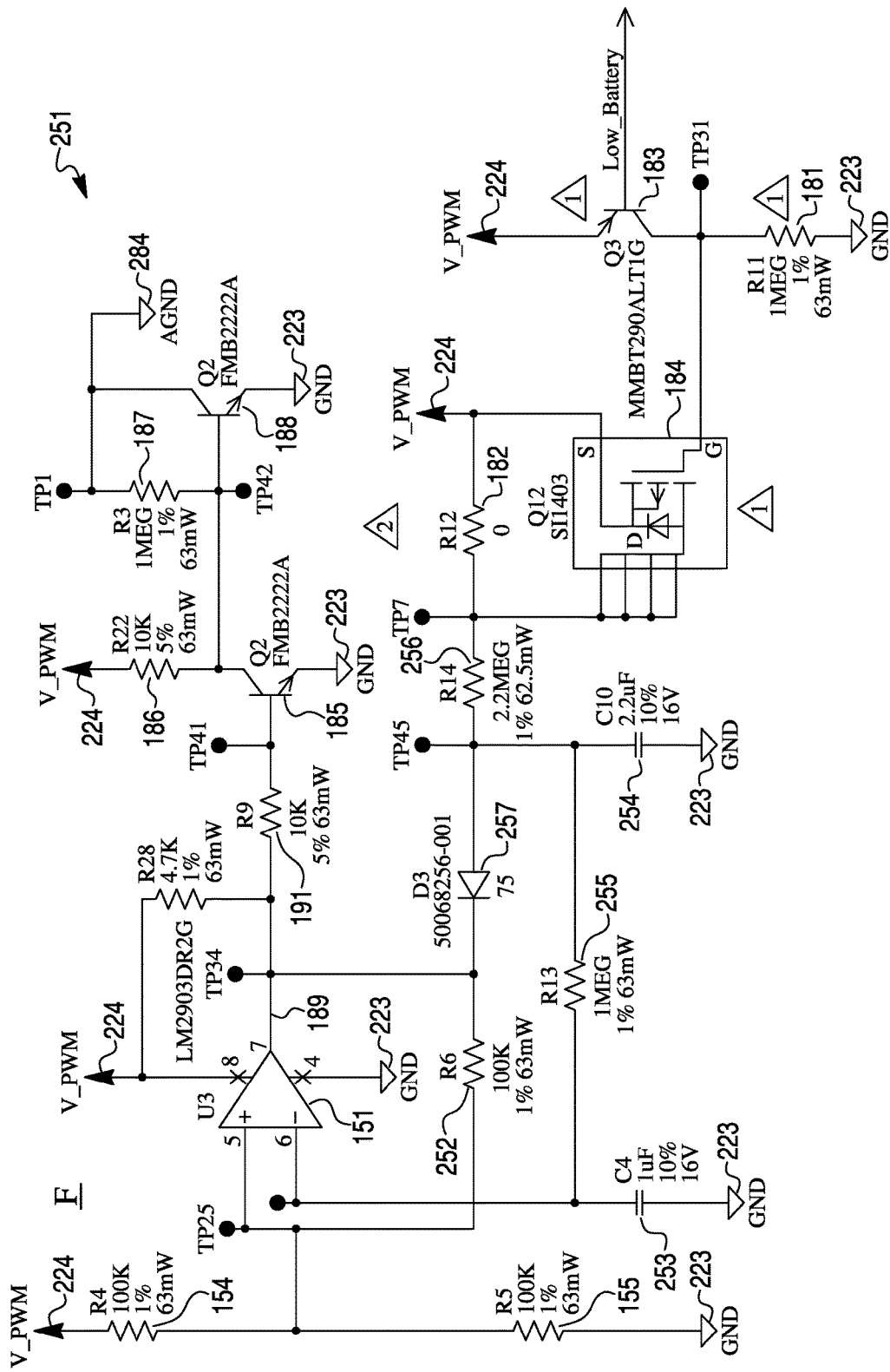
FIG. 12 is a diagram of an inverting voltage level detector circuit with hysteresis.

Block 251 of FIG. 12 may have an amp 151 with an inverting input connected to one end of resistor 255 and one end of capacitor 253. A non-inverting input may be connected to one end of resistor 252, one end of a resistor 154 (R4) and one end of resistor 155. The other ends of resistors 154 and 155 may be connected to V_PWM 224 and GND 223, respectively. Output 189 of amp 151 may go to one end of a resistor 191 (R9), the other end of resistor 252 and a cathode of diode 257. The other end of resistor 191 may be connected to a base of transistor 185.

To recap, a water sensing mechanism may incorporate a water leak detector having an alarm sound generator, a sound converter, and a controller connected to the sound converter. The alarm sound generator may emit an alarm sound having a predetermined pattern of one or more amplitudes for a specific duration of time, to indicate that the water leak detector has sensed moisture at some water equipment. The sound converter may detect and convert the alarm sound to an electrical signal that represents the alarm sound. The sound converter may filter out electrical signals that do not represent the alarm sound that has the predetermined pattern of one or more amplitudes during the specific duration of time. The sound converter may output an alarm electrical signal indicting that the water leak detector has sensed moisture or water.

The water equipment may be a water heater. The sound converter may be connected to a water heater control module. When the sound converter outputs the alarm electrical signal to the water heater control module, then the water heater control module may shut down the water heater. The water leak detector may use one milliwatt of electrical power or less while in a detection mode.

The water equipment may be a water heater. The sound converter may be connected to a wireless dongle. When the sound converter outputs the alarm electrical signal to the wireless dongle, the wireless dongle may send a signal to a water heater control module to shut down the water heater through wire/cable, and a notification may be sent to a remote device of a customer who can control the water heater through the wireless dongle.

The sound converter may be connected to a valve control device that can close a valve in a water line connected to the water equipment. The water leak detector may be situated in a place to detect water or moisture from the water equipment. The water equipment may be one or more items selected from s group comprising a house main water supply, valve, faucet, sink, washer, ice maker, bathroom, and water heater.

An approach for detecting and reporting a fluid leak from an apparatus, may incorporate determining whether there is water on a surface where a water apparatus is situated with a low power water detector, generating an alarm sound if water is determined to be on the surface with the water detector, detecting and converting the alarm sound and any other ambient sounds into electrical signals representing the alarm sound and the any other ambient sounds, filtering out electrical signals representing the any other ambient sounds, converting with a comparator the remaining electrical signals representing the alarm sounds into discrete signals having two or more levels of amplitude with one level of amplitude present at a time, and identifying with a processor any of the discrete signals that indicate water on the surface. Low power may mean one milliwatt or less.

The detecting and converting the filtering out electrical signals representing the any other ambient sounds, and the converting with a comparator the remaining electrical signals into discrete signals having two or more levels of amplitude with one level of amplitude at a time may be performed at second location different from a first location of the determining whether there is water on a surface where a water heater is situated, with a water detector.

The alarm sound may travel from the first location to the second location.

The second location may be situated at the control module of the water heater.

The second location may be at a water valve shut off module for a water line to the water heater.

The second location may be at a wireless dongle. The wireless dongle may be connected to a remote device.

A fluid alarm system may incorporate a fluid leak detector, an audio detection circuit, and a processor. The fluid leak detector may incorporate an audio alarm. The audio detection circuit may incorporate a sound sensor and an audio-to-electrical signal converter. The processor may incorporate an electrical signal-to-status of fluid presence. The fluid leak detector, the audio detection circuit and the processor may use less than one milliwatt of power when in a standby detection mode.

The audio detection circuit may incorporate a microphone, a filter connected to the microphone, an amplifier connected to the amplifier, and a comparator connected to the amplifier.

The processor may be connected to the comparator and output a message that indicates a leak if there is fluid sensed by the fluid leak detector.

The audio detection circuit may be connected to a fluid heater control module.

When the audio detection circuit indicates a fluid leak to the fluid heater control module, then the fluid heater may be turned off by the fluid heater control module.

The audio detection circuit may be connected to a fluid valve shutoff for a main fluid line that supplies the fluid heater with fluid.

The audio detection circuit may be connected to a wireless dongle. The wireless dongle may be connected to a fluid heater control module.

A smart phone, a tablet, a desk computer, or an electronic notebook may enable a user to receive information from the wireless dongle and send commands to the fluid heater control module to turn on or off the fluid heater, and to adjust a set point temperature for the fluid heater.

A mode of wirelessness of the wireless dongle may be selected from a group consisting of Wi-Fi, Bluetooth™ and Redlink™.

The fluid leak detector may be located on a floor where the fluid heater is situated. The fluid may be water.

Any publication or patent document noted herein is hereby incorporated by reference to the same extent as if each publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A water sensing system comprising:
a water leak detector having an alarm sound generator, wherein the alarm sound generator is configured to emit an alarm sound having a predetermined pattern of one or more amplitudes for a specific duration of time in response to the water leak detector sensing moisture at water equipment;
a water valve shutoff device comprising:
a sound converter configured to:
detect sound and convert the sound to an electrical signal;
filter out electrical signals that do not represent the alarm sound that has the predetermined pattern of one or more amplitudes during the specific duration of time; and
in response to detecting electrical signals that represent the alarm sound, output an alarm electrical signal indicating that the water leak detector has sensed moisture or water,
wherein the water valve shutoff device is configured to turn off a water supply in response to the alarm electrical signal.

2. The system of claim 1, wherein
the water leak detector uses one milliwatt of electrical power or less while in a detection mode.

3. The system of claim 1, wherein
the water equipment is a water heater.

4. The system of claim 1, wherein
the water equipment is one or more items selected from a group comprising a house main water supply, valve, faucet, sink, washer, ice maker, bathroom, and water heater.

5. The system of claim 1, wherein to turn off the water supply in response to the alarm electrical signal, the water valve shutoff device is configured to close a valve in a water line connected to the water equipment.

6. The system of claim 1, wherein the water leak detector includes a battery.

7. The system of claim 1, wherein the water equipment comprises a water heater, the system further comprising:
a water heater control device comprising an audio detection circuit, wherein the water heater control device is configured to shut down the water heater in response to the audio detection circuit detecting the alarm sound having the predetermined pattern of one or more amplitudes for the specific duration of time.

8. The system of claim 1, further comprising:
a wireless dongle device comprising an audio detection circuit, wherein the wireless dongle is configured transmit a signal to a water heater control device in response to the audio detection circuit detecting the alarm sound having the predetermined pattern of one or more amplitudes for the specific duration of time.

9. The system of claim 1, further comprising:
a wireless dongle device comprising an audio detection circuit, wherein the wireless dongle is configured to transmit information to a user device in response to the audio detection circuit detecting the alarm sound having the predetermined pattern of one or more amplitudes for the specific duration of time.

10. The system of claim 9, wherein the wireless dongle device is configured to transmit information to the user device over WiFi.

11. A water sensing system comprising:
a water leak detector having an alarm sound generator, wherein the alarm sound generator is configured to emit an alarm sound having a predetermined pattern of one or more amplitudes for a specific duration of time in response to the water leak detector sensing moisture at water equipment; and
a water heater control device comprising an audio detection circuit, wherein the water heater control device is configured to shut down the water heater in response to the audio detection circuit detecting the alarm sound having the predetermined pattern of one or more amplitudes for the specific duration of time.

12. The system of claim 11, further comprising:
a water valve shutoff device configured to turn off a water supply in response to detecting the alarm sound having the predetermined pattern of one or more amplitudes for the specific duration of time.

13. The system of claim 12, wherein to turn off the water supply in response to the alarm electrical signal, the water valve shutoff device is configured to close a valve in a water line connected to the water equipment.

14. The system of claim 11, wherein the water leak detector uses one milliwatt of electrical power or less while in a detection mode.

15. The system of claim 11, wherein the water equipment is a water heater.

16. The system of claim 11, wherein the water equipment is one or more items selected from s group comprising a house main water supply, valve, faucet, sink, washer, ice maker, bathroom, and water heater.

17. The system of claim 11, further comprising:
a wireless dongle device comprising an audio detection circuit, wherein the wireless dongle is configured to transmit information to a user device in response to the audio detection circuit detecting the alarm sound having the predetermined pattern of one or more amplitudes for the specific duration of time.

18. The system of claim 17, wherein the wireless dongle device is configured to transmit information to the user device over WiFi.

19. A water valve shutoff device comprising:
a water valve shut off mechanism; and
a sound converter implemented in circuitry and configured to:
detect sound and convert the sound to an electrical signal;
in response to detecting an alarm sound having a predetermined pattern of one or more amplitudes for a specific duration of time, output an alarm electrical signal that causes the water valve shut off mechanism to turn off a water supply.

20. The device of claim 19, wherein to turn off the water supply in response to the alarm electrical signal, the water valve shutoff mechanism is configured to close a valve in a water line connected to the water equipment.

* * * * *